July 24, 1934.   R. WEIDE   1,967,694
HECTOGRAPH MACHINE
Filed Dec. 4, 1931   10 Sheets-Sheet 2
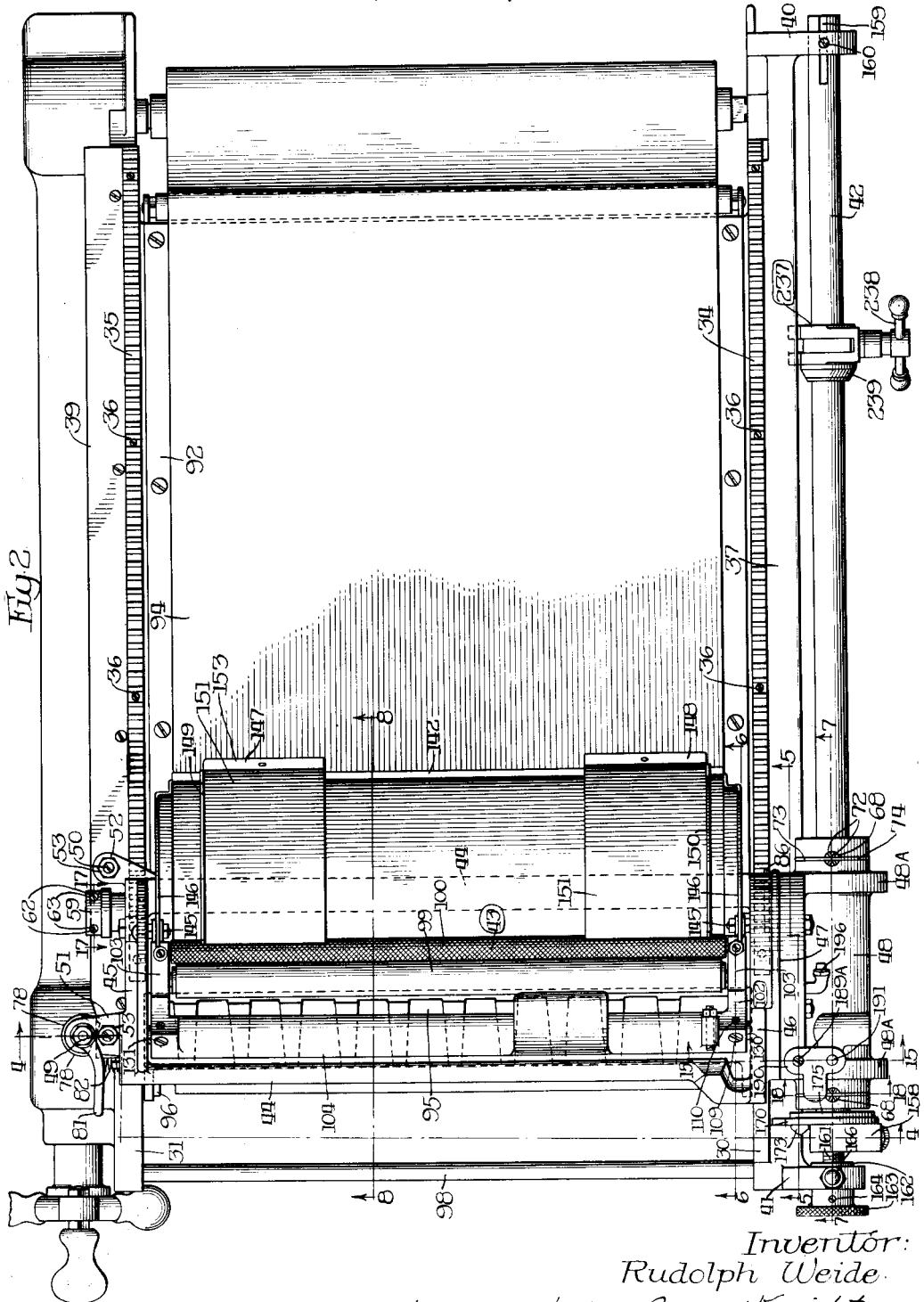
Inventor:
Rudolph Weide
By Wilkinson, Huxley, Byron & Knight
Attys July 24, 1934.  R. WEIDE  1,967,694
HECTOGRAPH MACHINE
Filed Dec. 4, 1931   10 Sheets-Sheet 3
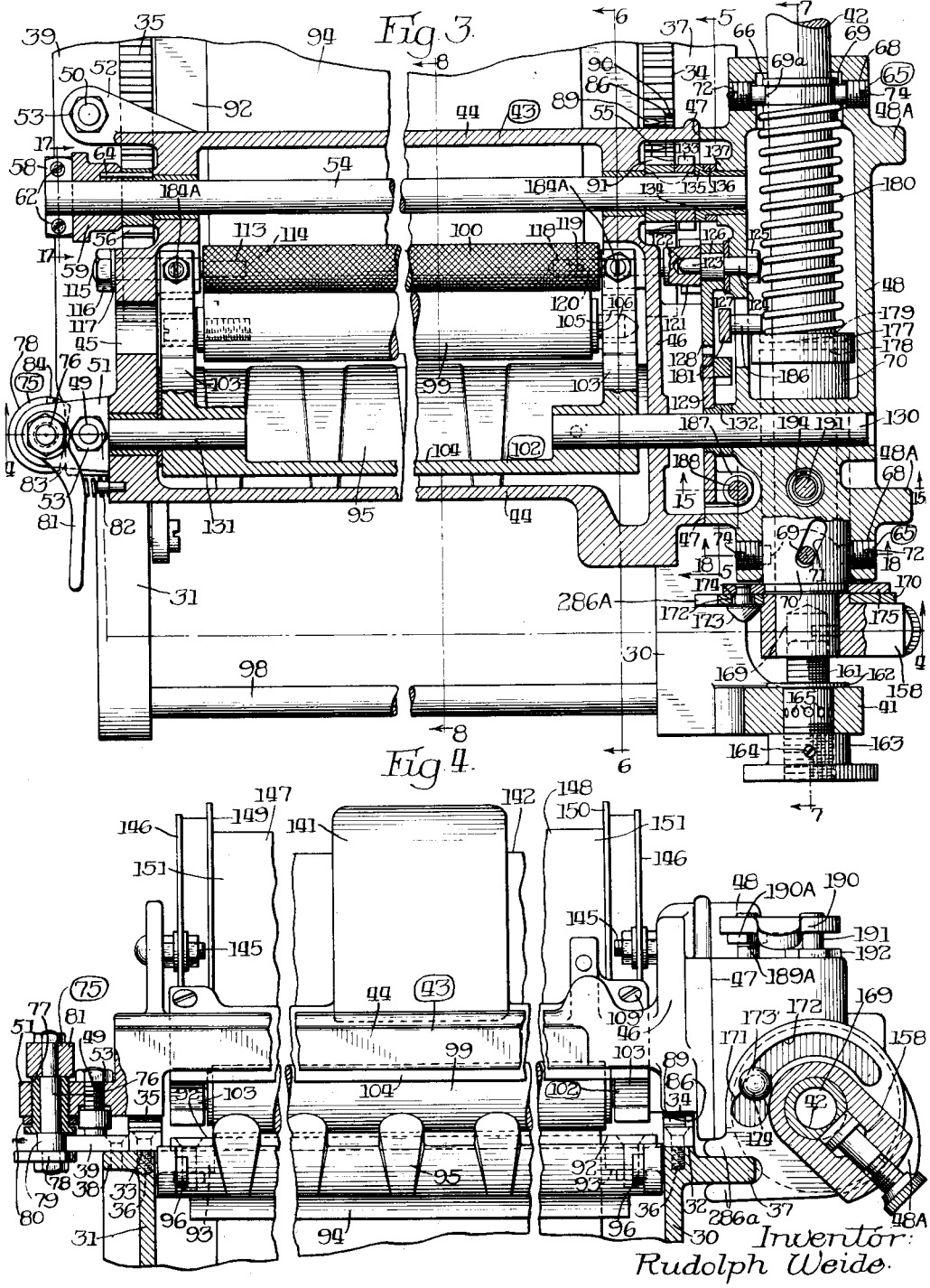
Inventor:
Rudolph Weide
By Wilkinson, Huxley, Byron & Knight
attys.

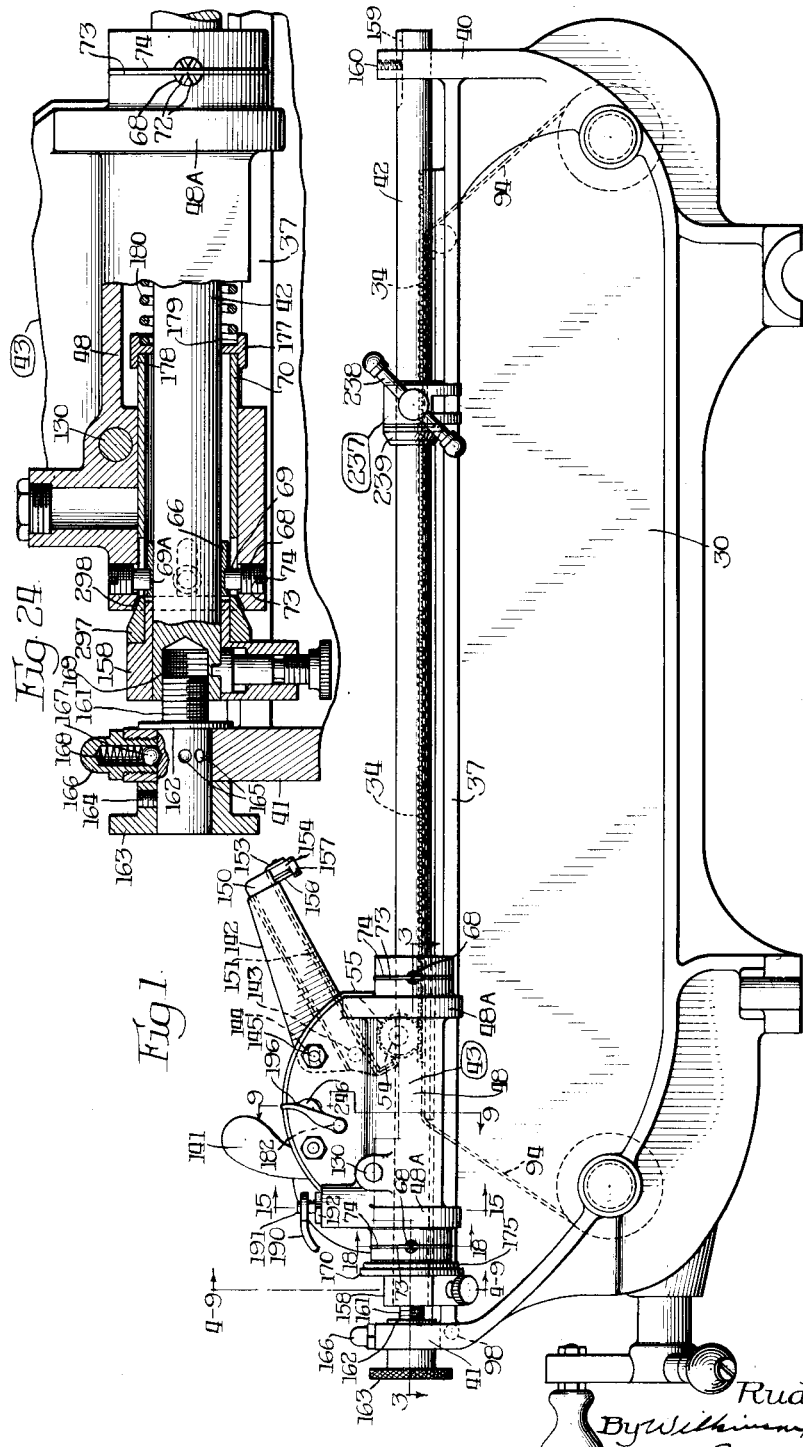

July 24, 1934.  R. WEIDE  1,967,694
HECTOGRAPH MACHINE
Filed Dec. 4, 1931  10 Sheets-Sheet 4
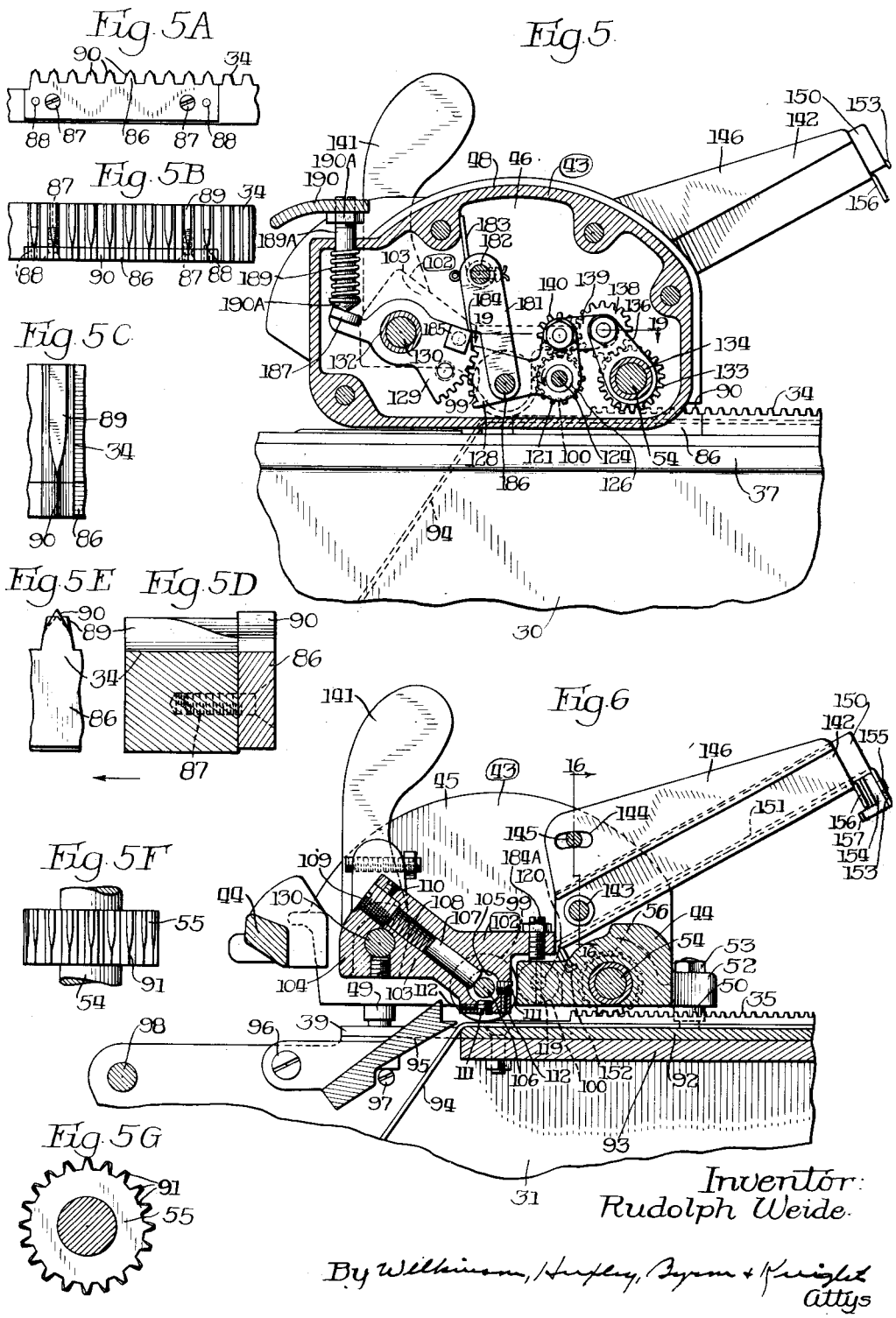
Inventor:
Rudolph Weide.
By Wilkinson, Huxley, Byron & Knight
attys July 24, 1934.  R. WEIDE  1,967,694
HECTOGRAPH MACHINE
Filed Dec. 4, 1931  10 Sheets-Sheet 5
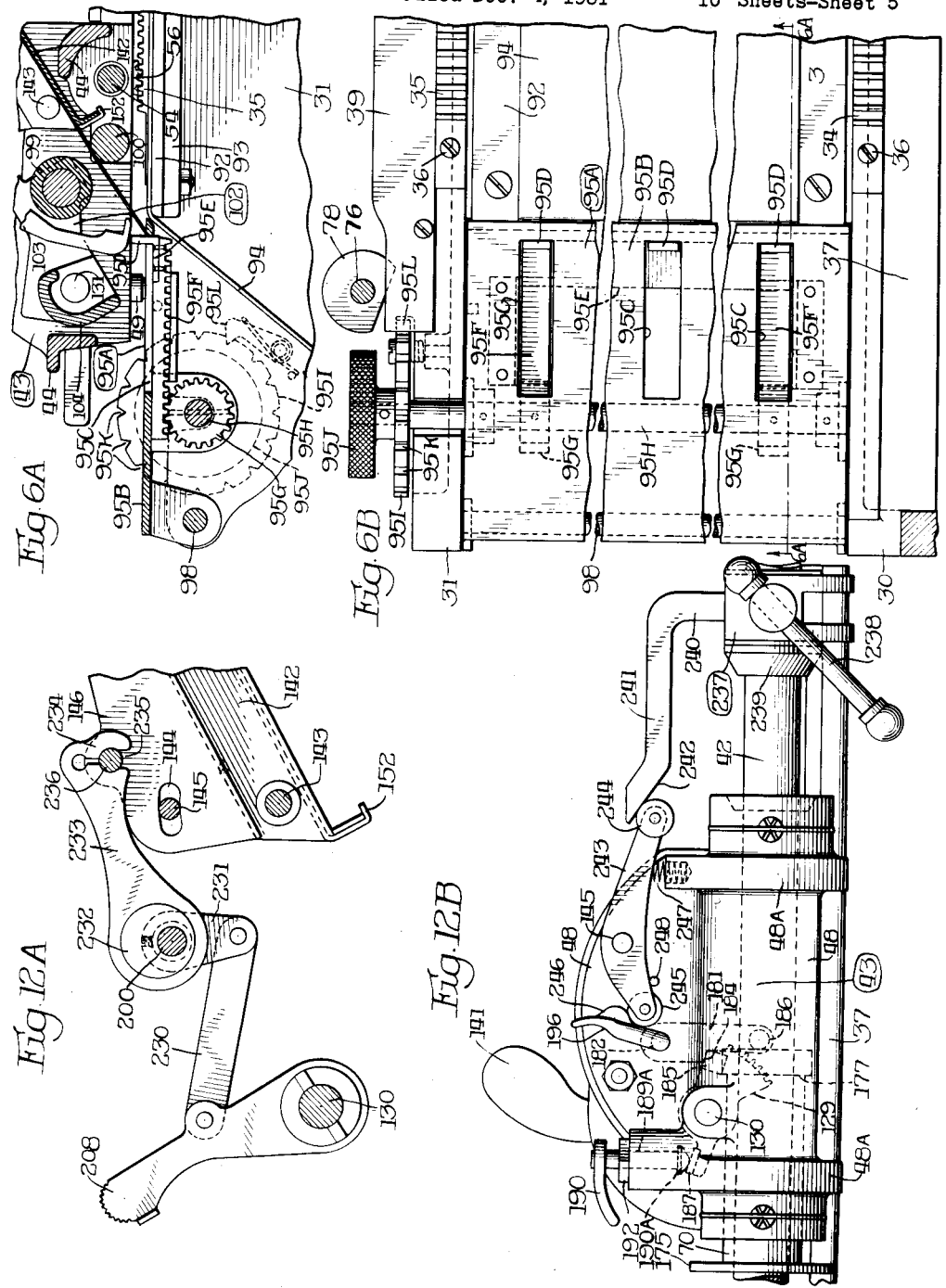
Inventor:
Rudolph Weide
By Wilkinson, Huxley, Byron & Knight
Attys July 24, 1934.   R. WEIDE   1,967,694
HECTOGRAPH MACHINE
Filed Dec. 4, 1931   10 Sheets-Sheet 6
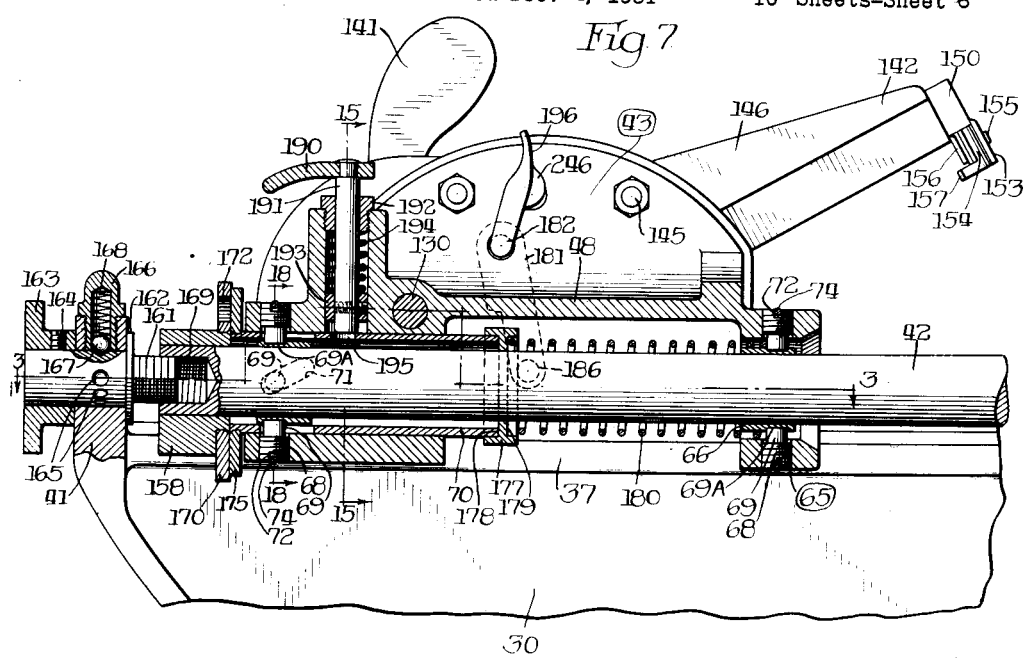
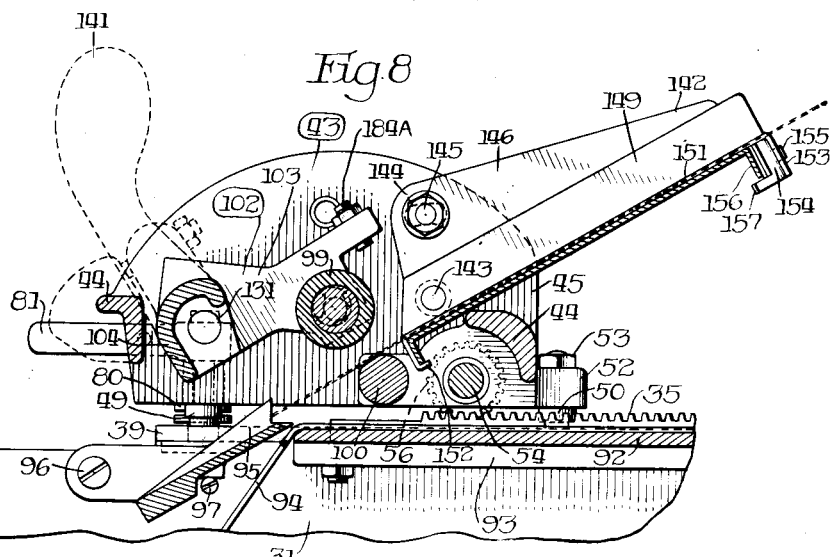
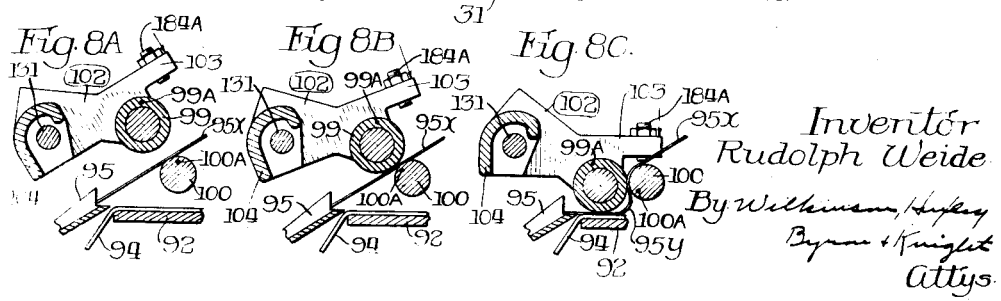
Inventor
Rudolph Weide
By Williamson, Hughey
Byrne & Knight
Attys

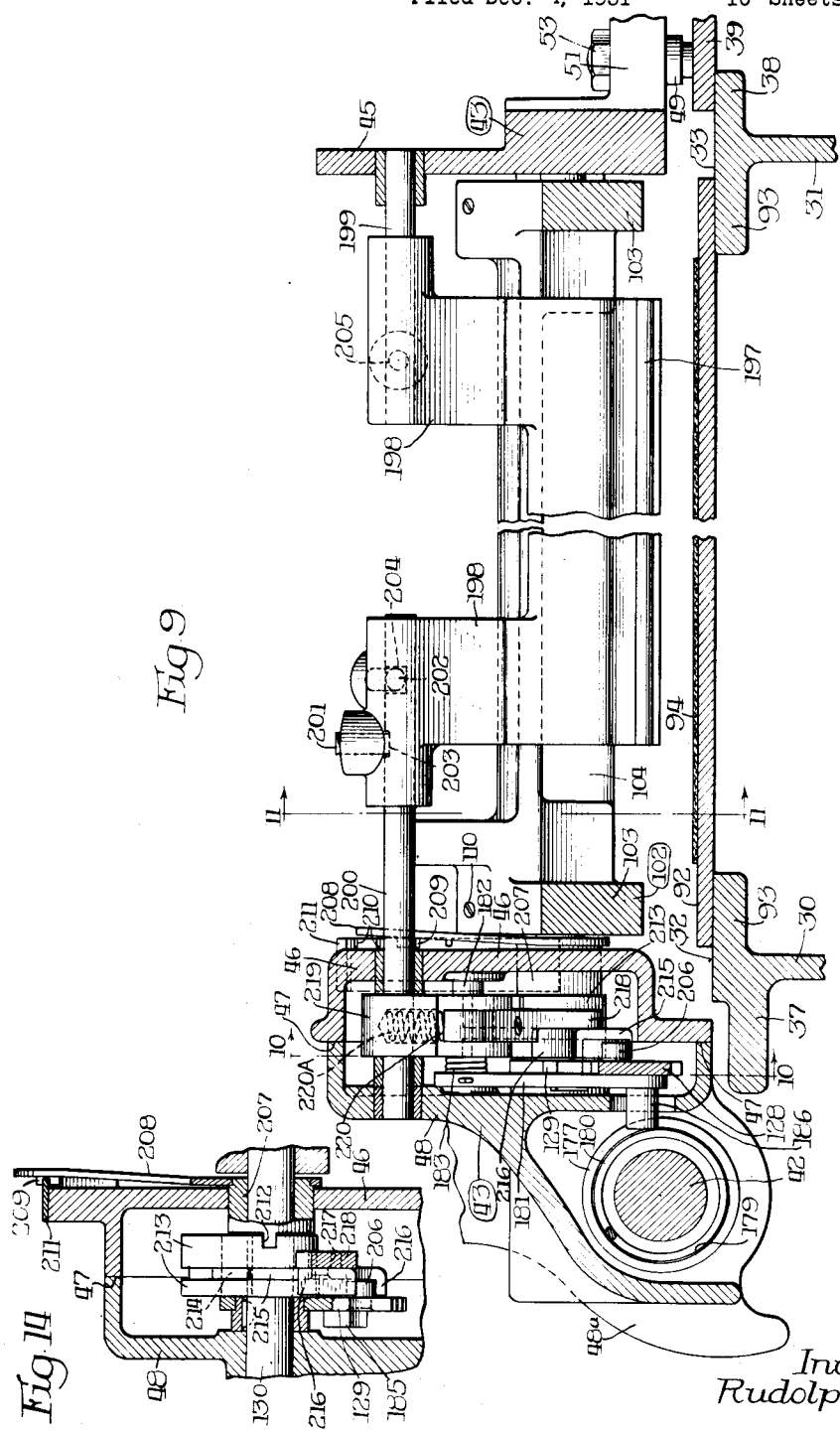

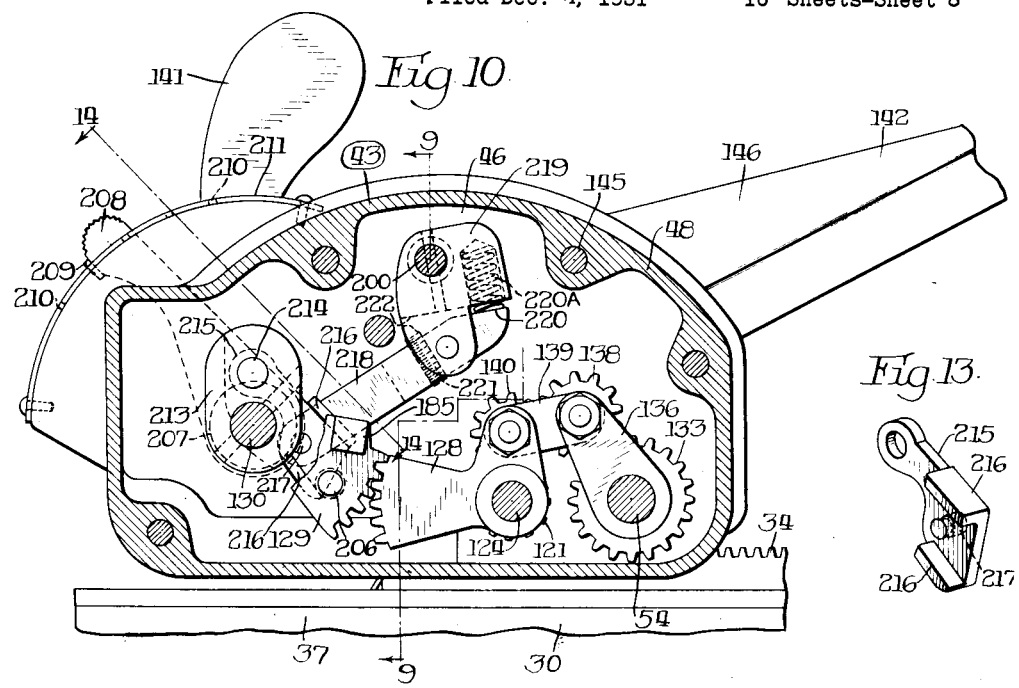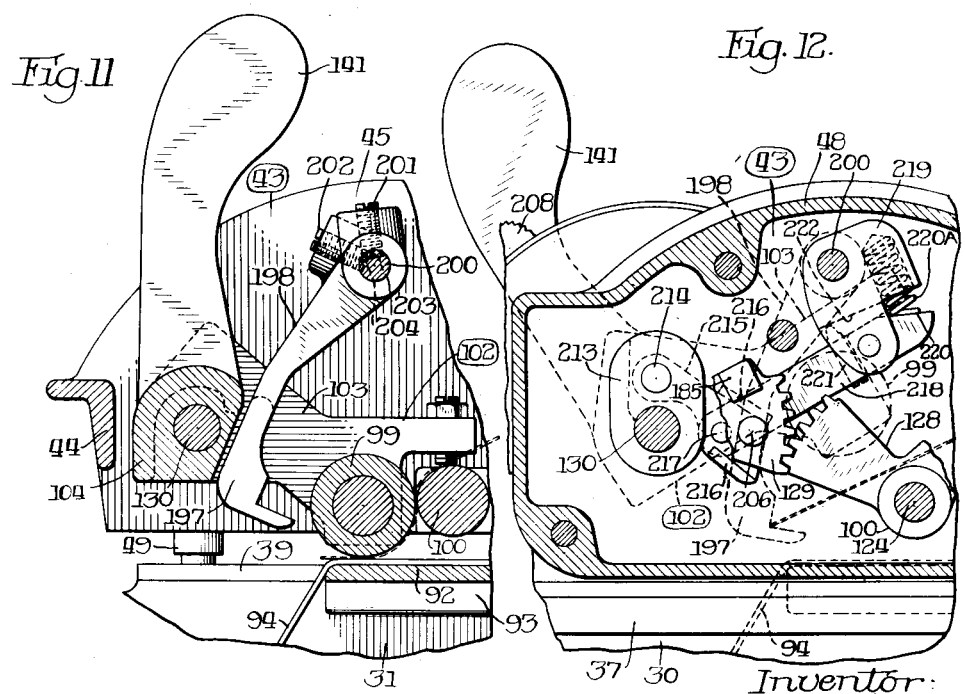

July 24, 1934.  R. WEIDE  1,967,694
HECTOGRAPH MACHINE
Filed Dec. 4, 1931  10 Sheets-Sheet 9

Inventor
Rudolph Weide

By Wilkinson, Huxley, Byron & Knight attys

July 24, 1934.  R. WEIDE  1,967,694
HECTOGRAPH MACHINE
Filed Dec. 4, 1931    10 Sheets-Sheet 10
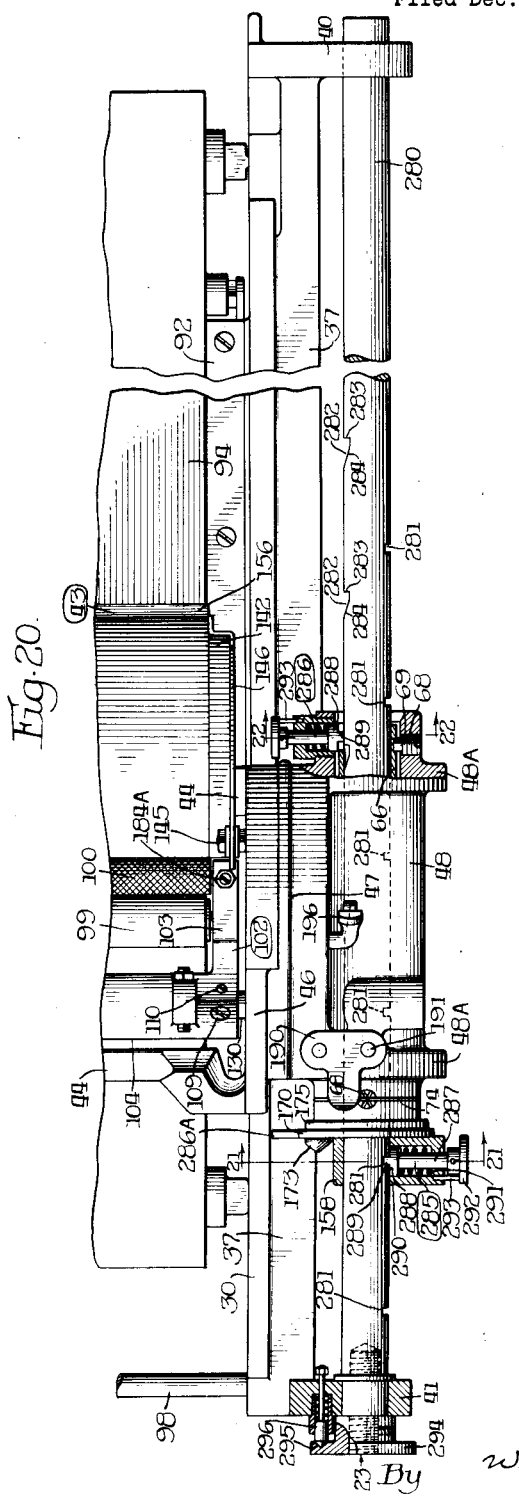
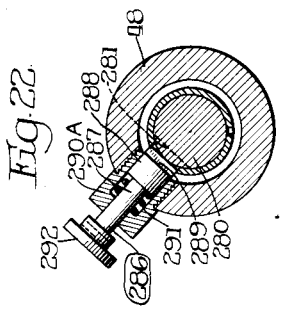
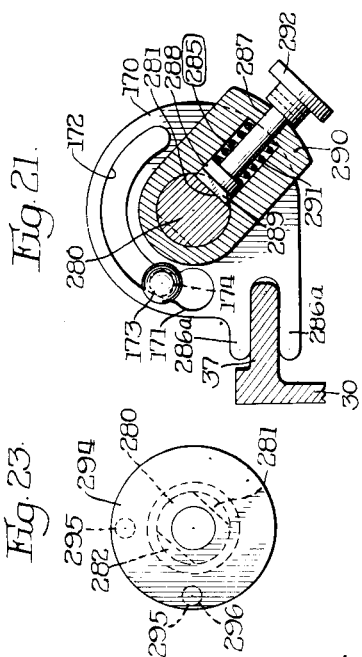
Inventor
Rudolph Weide Patented July 24, 1934

1,967,694

UNITED STATES PATENT OFFICE 1,967,694

HECTOGRAPH MACHINE

Rudolph Weide, Chicago, Ill., assignor to Ditto, Incorporated, Chicago, Ill., a corporation of West Virginia Application December 4, 1931, Serial No. 578,910

95 Claims. (Cl. 101—133)

The present invention relates to improvements in hectograph machines.

An object of the present invention is to provide an improved hectograph machine, particular reference being had to improved means for locking the carriage in the home position, whereby to insure perfect registration, while at the same time providing means for operating the carriage without incurring a fatiguing wrist motion on the part of the operator.

A further object is to provide a hectograph machine having carriage locking mechanism associated therewith in which the control of the carriage may be accomplished by relatively simple movements on the part of the operator.

A further object is to provide a hectograph machine having means for locking the carriage in home position which embodies readily operable means operable independently of the platen roller yoke for releasing said locking means.

A further object is to provide a hectograph machine in which the amount of physical effort on the part of the operator is minimized.

A further object is to provide a balanced construction of carriage which will prevent unbalanced thrusts and unnecessary drag between the paper engaging rollers and the paper.

A further object is to provide a hectograph machine having improved means for maintaining the moving carriage in proper alignment relative to the bed of the machine, thereby avoiding excessive wear and whipping and binding action.

A further object is to provide a hectograph machine which will minimize the likelihood of distortion of parts in regular commercial service and which will reduce the amount of servicing required.

A further object is to provide a hectograph machine having readily operable adjusting means for positioning the carriage of said machine with reference to the bed thereof.

A further object is to provide a hectograph machine having a swinging carriage and having rack and pinion means, or its equivalent, for insuring proper alignment of said carriage transversely of said machine, together with means for insuring that said rack and pinion means will mesh without clashing.

A further object is to provide a sturdy carriage frame of improved construction which will provide efficient floating action of the carriage platen and minimize the tendency for the parts to get out of proper adjustment.

A further object is to provide a hectograph machine having an improved type of floating platen roller which will permit the use of a sturdy carriage frame and which will provide a floating action between the platen roller and the printing surface, together with a floating action between the platen roller and the pressure or gripping roller.

A further object is to provide an improved hectograph machine having a novel floating platen roller which will accomplish the smooth application of the paper to the gelatin surface as well as the efficient stripping of the paper therefrom.

A further object is to provide an improved hectograph machine which will apply the paper to the gelatin surface without wrinkling of said paper.

A further object is to provide an improved hectograph machine having a floating platen roller of an improved design, which will avoid the danger of excessive pressure on the gelatin surface.

A further object is to provide an improved hectograph machine which combines the advantages of proper alignment of the carriage with ease of moving said carriage out of operative position, whereby the gelatin band may be readily removed and replaced.

A further object is to provide a hectograph machine which combines the advantages of proper alignment of the carriage at all times, the holding of the carriage in proper relationship with the bed, and the ready removal of said carriage from operative relationship with the bed when desired.

A further object is to provide a hectograph machine having a swinging carriage together with a pair of racks and a pair of pinions, or equivalent means, for insuring proper alignment of said carriage, together with means for providing the proper positioning of said pinions relative to each other.

A further object is to provide a hectograph machine having the advantage that in operation a push and a pull on the platen roller yoke is sufficient to operate the carriage throughout its cycle without variation of the pressure on the printing surface, avoiding the possibility of rebound and avoiding the possibility of whipping action, and without requiring special attention on the part of the operator.

A further object is to provide a hectograph machine having dual floating action of the platen roller relative to the pressure roller and the printing surface to insure proper stripping of the paper.

A further object is to provide a hectograph machine having a positive driving connection between the pressure roller and the means for operating the platen roller, whereby snug registration of the paper against the margin bar is had regardless of the weight of said paper.

A further object is to provide a hectograph machine having a definite relationship between the movement of the carriage and the rotation of the pressure roller, whereby to insure the proper application of the paper to the gelatin surface and the proper stripping of said paper from said gelatin surface.

A further object is to provide a hectograph machine having a definite relationship between the movement of the pressure roller and the movement of the operating means for the platen roller, together with a definite relationship between the movement of the carriage and the rotation of the pressure roller, whereby proper registration of the paper relative to the margin bar is insured and whereby the proper application of the paper to and the stripping of the paper from the gelatin surface is insured.

A further object is to provide a hectograph machine involving a floating platen roller and a pressure roller having its axis fixed relative to the carriage in which the action of the pressure roller is controlled to insure the proper cooperation of the pressure roller and the platen roller during the stripping operation.

A further object is to provide a hectograph machine having improved means for latching the platen roller yoke in predetermined relationship with the bed of the machine, together with improved means for releasing said locking means, said releasing means being operable automatically when the carriage is in the home position and being manually operable at all other positions of the carriage throughout its stroke.

A further object is to provide an improved hectograph machine having means for latching the platen roller in predetermined relationship with the bed and means for automatically releasing said latching means at the two ends of the stroke of the carriage.

A further object is to provide a hectograph machine having means for latching the platen roller in predetermined position relative to the bed of the machine, together with automatic means for releasing said latching means at the rear end of the travel of said carriage, whereby when a sheet of paper has been laid out flat upon the gelatin surface to its full extent and has been stripped from said gelatin surface, the carriage may be returned to its home position without danger that the platen roller will engage the exposed gelatin surface.

A further object is to provide a hectograph machine having improved front stop mechanism for the carriage which will combine the advantages of an automatic carriage lock with the means for imparting a forward impetus to the carriage to facilitate the easy starting of the same.

A further object is to provide a hectograph machine having improved mechanism providing a front stop for the carriage, which mechanism includes resilient means for effecting the locking and unlocking of the carriage relative to the bed of said machine in response to application of a small force without fatiguing wrist movement to the carriage handle.

A further object is to provide a hectograph machine having means for latching the platen roller in operative position and for latching the carriage in home position in which the proper application of the paper to the gelatin surface is insured before said carriage is released.

A further object is to provide an improved construction of hectograph machine involving a geared construction at the two ends of the carriage for securing proper alignment of said carriage, together with improved means for preventing vertical rebound of the carriage, and together with structure permitting the ready swinging up of the carriage to enable the operator to change the gelatin band.

A further object is to provide a hectograph machine having means for locking the carriage in home position, which carriage may be swung up out of operative position and returned thereto without modifying any of the adjustments of the carriage.

A further object is to provide a hectograph machine having readily operable means for adjusting the position of the front stop for the carriage for the purpose of compensating for differences in the margins desired on the hectographed sheets or for possible slippage of the gelatin band.

A further object is to provide an improved carriage construction for a hectograph machine in which the plane of the sliding surface of the paper guide is tangential to the pressure roller whereby the tendency of flimsy paper to sag below the margin bar is minimized.

A further object is to provide improved paper feeding mechanism which will minimize difficulties which have hitherto been encountered due to the sagging of flimsy paper.

A further object is to provide a hectograph machine having an adjustable front stop for the carriage and a paper guide, the angular position of which paper guide is adjustable to compensate to a practical extent for changes in position of said front stop.

A further object is to provide a hectograph machine having a paper feeding guide whose angular position relative to the remainder of the carriage is adjustable whereby to compensate for variations which are likely to occur in commercial manufacture.

A further object is to provide a hectograph machine having an automatic margin bar with improved means for adjusting the initial or operative position thereof.

A further object is to provide a hectograph machine of the kind immediately above referred to which is also provided with a paper guide the angular position of which is adjustable, whereby an efficient relationship between said automatic margin bar and said paper guide may be maintained.

A further object is to provide a construction of the kind mentioned in the preceding object in which there is provided an operative connection between the adjusting means for said automatic margin bar and said paper guide whereby the desired relationship between said automatic margin bar and said paper guide may be automatically maintained.

A further object is to provide a construction of the kind mentioned in the preceding object in which the operative connection between the automatic margin bar and the paper guide may be readily disconnected and said paper guide may be used with the standard margin bar without interference from the automatic margin bar.

A further object is to provide a hectograph machine having a swinging carriage having means permitting the swinging of said carriage only at a region adjacent to an end of said machine, whereby the danger of applying dangerous force to the supporting rod for said swinging carriage is minimized.

A further object is to provide a hectograph machine having a swinging carriage slidably carried by a rod, which carriage is supported at its swinging extremity by a track, said track having simple and efficient means for adjusting the position of said carriage relative to said bed.

A further object is to provide a hectograph machine having improved means for limiting the stroke of the carriage to predetermined sections of the hectograph surface.

A further object is to provide an improved hectograph machine well adapted to meet commercial requirements.

Further objects will appear as the description proceeds.

Referring to the drawings—

Figure 1 is a view in side elevation of one embodiment of the present invention;

Figure 2 is a top plan view of the structure shown in Figure 1;

Figure 3 is a transverse sectional view taken along the planes indicated by the arrows 3—3 in Figures 1 and 7;

Figure 4 is an end view, partly in section, the sectional parts being taken along the planes indicated by the arrows 4—4 of Figures 1, 2 and 3;

Figure 5 is a sectional view on an enlarged scale, a section being taken along the planes indicated by the arrows 5—5 of Figures 2 and 3;

Figures 5A, 5B, 5C, 5D, 5E, 5F and 5G illustrate means which may be used for piloting the pinions into proper meshing relationship with the racks;

Figure 6 is a sectional view taken along the plane indicated by the arrows 6—6 of Figures 2 and 3;

Figure 6A is a view similar to part of Figure 6 but showing the applicability of a novel type of standard margin bar to the present invention;

Figure 6B is a top plan view of part of the structure shown in Figure 6A;

Figure 7 is a sectional view taken along the plane indicated by the arrows 7—7 of Figures 2 and 3;

Figure 8 is a sectional view taken along the plane indicated by the arrows 8—8 of Figures 2 and 3;

Figures 8A, 8B and 8C are diagrammatic views illustrating the operation of the paper engaging rollers;

Figure 9 is a sectional view taken along the planes indicated by the arrows 9—9 in Figures 1 and 10;

Figure 10 is a sectional view taken along the planes indicated by the arrows 10—10 of Figure 9;

Figure 11 is a sectional view taken along the plane indicated by the arrows 11—11 of Figure 9;

Figure 12 is a sectional view taken along the planes indicated by the arrows 10—10 of Figure 9, but with the parts in a slightly different position from those illustrated in Figures 9 and 10 with respect to the platen operating handle;

Figure 12A illustrates a detail of construction involving the interconnection of the adjustable automatic margin bar and the adjustable paper guide;

Figure 12B illustrates a detail of construction including the platen roller releasing means operative at both ends of the stroke of the carriage;

Figure 13 illustrates another detail of construction;

Figure 14 is a sectional view taken along the planes indicated by the arrows 14—14 of Figure 10;

Figure 20 is a plan view of a modified structure;

Figure 21 is a sectional view taken along the plane indicated by the arrows 21—21 of Figure 20;

Figure 22 is a sectional view taken along the plane indicated by the arrows 22—22 of Figure 20;

Figure 23 is an end view of part of the construction of Figure 20 taken in the direction of the arrow 23; and Figure 24 is a view similar to Figure 7 but omitting certain locking features of Figure 7.

Figure 17:
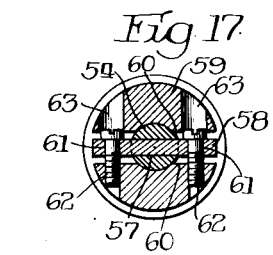
Figure 17 is a sectional view taken along the plane indicated by the arrows 17—17 of Figures 2 and 3.

Referring now to Figures 1 and 4, the hectograph machine illustrated therein comprises a pair of side frames 30 and 31, which side frames are secured in parallel relationship with each other by means of cross braces, which need not be described in detail. Said side frames have flat upper edges 32 and 33, respectively, which upper edges are preferably disposed in a single plane. Mounted upon said upper edges 32 and 33 are a pair of elongated racks 34 and 35, which racks are secured to the side frames 30 and 31 by means of machine screws 36—36 (Fig. 2) or other preferred means. The side frames 30 and 31 are provided with laterally extending horizontal flanges 37 and 38, respectively. The flange 38 has its top surface in the same plane as the upper edge of the side frame 31, and provides a mounting means for an elongated bracket 39, which extends laterally beyond the boundary of the flange 38. Said bracket 39 forms a track for the carriage, to be described hereinafter, and also provides means for preventing vertical rebound of the carriage under operating conditions.

The side frame 30 is provided with a pair of laterally extending brackets 40 and 41 (Figs. 1 and 2), which provide mounting means for the guide rod 42, which guide rod should be disposed parallel with the side frames 30 and 31. Said guide rod 42 is preferably of circular contour in cross section. The guide rod 42 cooperates with the track 39 for providing bearings at the two sides of the machine for the movable carriage, now to be described.

The numeral 43 indicates as a whole a movable carriage adapted to have bearing relationship with the guide rod 42 and the track 39. Said carriage may consist of a casting having the transverse members 44—44 and the two side walls 45 and 46. Said side wall 46 has a side face 47, to which is bolted a housing 48 forming part of the carriage 43, which housing is internally cored and receives the guide rod 42. Brackets 48A (Fig.

9), integral with the housing 48, limit the swing of the carriage 43 away from the bed by reason of engagement of said brackets 48A with the adjacent frame member 30. Mounted within said housing 48 are certain adjustable bushings, to be described hereinafter, for maintaining said housing 48 in a predetermined relationship with respect to the guide rod 42 in all directions normal to the length of said rod. The carriage 43 is provided, at its left-hand end as the parts are viewed in Figure 3, with one or more adjustable rest screws 49 and 50, which rest screws are supported by brackets 51 and 52, respectively, formed integral with the side wall 45 of the carriage 43. Said rest screws bear upon the track 39 and maintain the left-hand carriage end in proper relationship with the right-hand end thereof and with the remainder of the machine. In order that the accurate positioning of the carriage at the left-hand end thereof may be accomplished, said rest screws 49 and 50 should be accurately adjustable. According to the construction at present preferred, the brackets 51 and 52 (Fig. 4) are tapped for screw-threaded relationship with said rest screws 49 and 50, which are provided with lock nuts 53—53, whereby the rest screws may be held in adjusted position relative to their brackets 51 and 52. The bearing extremities of said rest screws 49 and 50 which bear against the track 39 should present a minimum of resistance. For this reason said rest screws 49 and 50 may be of bronze, or if preferred a phenolic condensation product may be used. The material of the track 39 may be steel. Disposed in bearings within the carriage 43 is the cross shaft 54 (Fig. 3), which cross shaft has secured thereto, outwardly of the walls 45 and 46 of the carriage, the pinions 55 and 56 adapted to mesh respectively with the racks 34 and 35. The proper level of the axes of the pinions 55 and 56 relative to their corresponding racks 34 and 35 may be insured by adjustment of the rest screws 49 and 50 on the left-hand side of the machine as the parts are viewed in Figures 2 and 3 and by adjustment of the bushings within the housing 48 at the right-hand side of the machine, which bushings will be described presently. It will be understood, of course, that the guide rod 42, the track 39 and the racks 34 and 35 will all be disposed in parallel horizontal planes. By reason of the meshing relationship between the pinions 55 and 56 with the racks 34 and 35, the proper alignment of the carriage 46 relative to the remainder of the machine is assured.

For the purpose of insuring that the pinions 55 and 56 will both mesh properly with their respective racks 34 and 35, a construction is contemplated permitting the rotative adjustment of the pinion 56 relative to the pinion 55. For an illustration of this construction reference may be had to Figures 3 and 17. The extremity of the cross rod 54 is slotted diametrically, said slot being indicated by the numeral 57. Disposed within said slot 57 is a flat cross bar 58. Secured to the pinion 56 is a housing 59, which is diametrically slotted as indicated by the numeral 60, the slot 60 being of sufficient width to permit a swinging movement of the cross bar 58 therein. Said cross bar 58 is provided with the holes 61—61 adjacent to its extremities, which holes are adapted to receive the machine screws 62—62, which machine screws are threaded into the body of the housing 59 and have their heads bearing upon the cross bar 58, whereby to exert opposing forces in the tangential directions on the two sides of the center of the cross bar 58. Said housing 59 is provided with holes 63—63, permitting access by means of a screw driver with the heads of the machine screws 62—62. The housing 59 may be secured to the pinion 56 by means of a pin 64, or, if preferred, said housing 59 may be made integral with the pinion 56, comprising a mere hub thereof. It will be understood without detailed explanation that the housing 59, and consequently the pinion 56, may be adjusted rotatively relative to the cross rod 54 by manipulation of the machine screws 62—62. Upon tightening up upon said machine screws 62—62 the pinion 56 will be held in said adjusted position relative to said cross rod 54 and consequently relative to the pinion 55 at the other end of the carriage 43.

Figure 18:
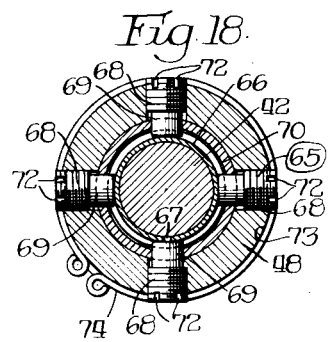
Figure 18 is a sectional view taken along the plane indicated by the arrows 18—18 of Figures 1, 2, 3 and 7.

The bushings for providing adjustable bearings for the carriage 43 on the guide rod 42 will now be briefly described. By reference to Figures 3 and 18 it will be noted that the guide rod 42 is provided with a pair of bushing assemblies 65—65. Said bushing assemblies may be identical, and a description of one will suffice for a description of both. The bushing assembly 65 includes a split ring 66 encircling the guide rod 42 throughout all but a small fraction of its periphery. The gap in said split ring is indicated by the numeral 67. Bearing upon said split ring are a plurality of setscrews 68—68. Four setscrews 68 are illustrated in each assembly. Said setscrews are screw-threaded into the housing 48 and have their inner extremities bearing against the split ring 66 riding in a circumferential groove 69A. Said inner extremities are indicated by the numerals 69—69 and are of reduced diameter. The bearing assembly 65 at the forward end of the machine houses a sleeve 70, the functions of which will be described presently. No such sleeve appears in the bearing assembly 65 at the rear end of the housing 48. Said sleeve 70 at the forward end of the housing 48 is provided with a plurality of cam slots 71—71, the functions of which will be described presently. The reduced portions 69—69 of the setscrews 68 extend through said slots 71—71 in the sleeve 70 and engage the periphery of the split ring 66. The outer extremities of each setscrew 68 are provided with a plurality of diametrical slots, indicated by the numerals 72—72. The adjacent portion of the housing 48 cooperating with each of the bushing assemblies 65 is provided with a circumferential slot indicated by the numeral 73. A circumferential spring 74 is disposed in each of the slots 73 as well as in those slots 72—72 which are in alignment with the slot 73. By reason of this construction, after the setscrews 68—68 have been disposed in their proper adjusted positions they may be locked therein by means of the circumferential spring 74. By reason of the fact that a plurality of slots 72—72 are disposed in the extremity of each of the set screws 68, this locking action may be had without disturbing the proper adjusted position of any setscrew 68 to a material extent. The setscrews 68—68 which govern sidewise movement of the carriage 43 (i. e. sliding movement of the carriage transversely of the bed) need not be accurately adjusted, inasmuch as the teeth of the racks 34 and 35 and the pinions 55 and 56 are of sufficient length transversely of the machine to prevent demeshing thereof during operation of the carriage. The proper positioning of the carriage normal to the longitudinal axis of the machine is assured by the meshing of said racks and pinions. The adjustment of the setscrews 68—68 which govern sidewise movement of the carriage needs to be only sufficiently accurate to insure that pinion 56 at the swinging end of the carriage will mesh with the rack 35. The adjustment of the setscrews 68—68 which govern rebound of the carriage relative to the bed should be accurately adjusted, sufficient clearance being provided to eliminate binding action.

As indicated above, the carriage 43, by reason of its rigid relationship with the housing 48, has a swinging movement about the axis of the guide rod 42 as well as a sliding movement on said rod 42, and has a sliding bearing relationship with the track 39 through the rest screws 49 and 50. In order that the carriage 43 may be held down in operative position, a latch is provided, which latch is indicated as a whole by the numeral 75 (see Figs. 3 and 4). Said latch comprises a flat cam-shaped plate secured to a stem 76, which is rotatably disposed within a bushing 77. Said bushing 77 is threaded into a bracket 51, which extends laterally from the side wall 45 of the carriage assembly. Said stem 76 is provided with the shouldered portion 79 for abutting one extremity of the bushing 77. The position of said bushing 77 relative to the bracket 51 may be adjusted by rotation of said bushing. When once adjusted, said bushing is locked in position by means of the lock nut 80. Disposed at the upper extremity of the bushing 77 is the finger 81, which is spring-pressed to the left as the parts are viewed in Figure 3 by means of the spring 82. The track 39 in the illustrated embodiment of the present invention is of such width with relation to the contour of the cam plate 78 that said track has overlying relationship with said plate 78 throughout the length of said track 39 regardless of the position of the finger 81, except at the extreme forward position of the carriage 43. The track 39 at the forward extremity thereof is reduced in width, as indicated by the numeral 83, said reduced width being sufficient, however, to overlie the plate 75 when the finger 81 is pressed outwardly to the limit of its travel by the spring 82. When the finger 81 is drawn inwardly, however, that is—in a counter-clockwise direction as the parts are viewed in Figure 3, the cam plate 78 is allowed to clear the reduced forward extremity of the track 39, whereby the carriage assembly 43 may be lifted and swung about the axis of the guide rod 42. By reason of the construction illustrated, a sufficiently close fit may be had between the under side of the track 39 and the upper surface of the cam plate 78 whereby undesired lifting action or rebound action of the carriage 43 will be prevented. When the carriage is in its home or forward position, however, the operator may, by drawing toward the right upon the finger 81, cause the cam plate 78 to clear the reduced extremity of the track 39 whereby the carriage may be swung to a position clear of the bed of the machine. Clockwise rotation of the finger 81 as the parts are viewed in Figure 3 will be limited by a stop 84 upstanding from the cam plate 78 and adapted to abut against the bracket 51. A practical advantage of permitting the swinging of the carriage 43 only when it is adjacent to an end of the machine is the following. If swinging of the carriage 43 were permitted at a region intermediate of the length of the guide rod 42, a careless operator might exert such a destructive impact upon said guide rod as to bend it.

The same force applied to the guide rod adjacent to its end would not be effective to bend said rod. It will be understood, of course, that if it is preferred to have the carriage 43 liftable at other portions of its range of travel, this result may be attained by reducing the corresponding portion of the track 39.

The present invention contemplates structure which will pilot the pinion 55 into proper relationship with the teeth of the rack 34 when the carriage 43 is moved from inoperative position down into operative relationship with the remainder of the machine. A structure for performing these piloting functions is illustrated in detail in Figures 5A, 5B, 5C, 5D, 5E, 5F and 5G. In order that a proper meshing relationship may be had between the pinion 55 and the rack 34 (and consequently between the pinion 56 and the rack 35), the teeth of the pinion 55 may be given a special conformation, and those teeth of the rack 34 adjacent to the forward end of said rack 34 may be given a special conformation.

Referring to Figures 5A, 5B, 5C, 5D and 5E, it will be noted that the forward extremity of the rack 34 is cut out on the side adjacent to the rod 42, and in said cut out portion is located a plate 86, which is secured to the rack 34 by means of screws 87—87. Dowell pins 88—88 may be provided for accurately positioning the plate 86 relative to the rack 34. The teeth of the rack 34 at the forward extremity of said rack are tapered with an increasing taper from the right-hand side of said rack to the left-hand side thereof. These tapered teeth are indicated by the numerals 89—89. The plate 86 is provided with teeth 90—90 coincident with the teeth 89—89. Said teeth 90—90 are wedge-shaped in cross section, as clearly indicated in Figures 5C, 5D and 5E, and extend to a higher level than the teeth 89—89.

The pinion 55 has its teeth decreasing in cross section from left to right as the parts are viewed in Figures 3, 5F and 5G. Said tapered teeth are indicated by the numerals 91—91. In operation, as the carriage 43 is swung from inoperative toward operative position, the teeth 91—91 of the pinion 55 will, by reason of their cross sectional tapered conformation, locate themselves within the wedge-shaped teeth 90—90 of the plate 86, turning said pinion 55 through the small angle necessary to properly mesh the teeth of the pinion 55 with the teeth of the rack 34. The tapered teeth 91 will therefore be piloted into proper meshing relationship with the teeth 89—89 of said rack 34. By reason of the fact that said teeth 89—89 are tapered at their extremities adjacent to the plate 86, the possibility that the addenda of the teeth 89 should clash with addenda of the teeth 91 is avoided.

The bed of the machine is indicated by the numeral 92. Said bed is bolted to inwardly extending flanges 93—93 carried by the frame members 30—31 (see Fig. 4). Machine screws may be provided for the purpose of firmly securing the bed to said flanges 93—93. Said bed is adapted to form an abutment for the gelatin band 94, which may be stretched over said bed (see Fig. 5). As is well understood in the practice of hectograph machines, a carriage is commonly provided for laying a sheet of paper upon the gelatin band 94 and for stripping said sheet of paper from said gelatin band. As indicated above, the carriage for this purpose has in the illustrated embodiment of the present invention been indicated by the numeral 43. The numeral 95 indicates a standard margin bar which extends across the bed 92. No novelty for the margin bar 95 is claimed in this application and a full description thereof is therefore unnecessary. It will suffice to say that said margin bar 95 as illustrated in Figures 2, 4, 6 and 8 may be swung about the axis of the pins 96, which pins are mounted in the side frames 30 and 31. A stop 97 locates the margin bar 95 in its operative position. A cross bar 98 extending between the side frames 30 and 31 may locate the margin bar 95 in its inoperative position. The standard margin bar referred to is to be distinguished from an automatic margin bar carried by the carriage, which latter margin bar is used for the so-called marginless work according to well known practice. The present invention contemplates a margin bar for marginless work, which latter margin bar will be described in detail hereinafter. The margin bar for marginless work as contemplated by the present invention is adjustable with reference to its paper receiving position, whereby work having margins from substantially zero up to say about three-eighths of an inch or more may be efficiently handled. As will be explained hereinafter, the present invention contemplates a construction in which the margin bar for marginless work may be readily moved out of operative relationship with the paper guide, whereby the paper to be printed upon in the hectograph operation may be delivered to the standard margin bar 95 or its equivalent. In certain very important classes of work it is desirable to vary the margin upon different sheets of paper printed from the same master impression. As indicated above, the present invention contemplates an efficient means, through the medium of the automatic margin bar, for varying the margin upon such work from zero to say about three-eighths of an inch or more. In order that it may be clear that the present invention contemplates a structure in which the range of margins may be readily varied throughout all of the range required in practical operation, there has been illustrated in Figures 6A and 6B a standard margin bar of the adjustable type, whereby the paper receiving edge may be adjusted at will through a wide range.

The adjustable standard margin bar illustrated in Figures 6A and 6B is indicated as a whole by the numeral 95A. Said adjustable margin bar includes a plate 95B secured to the side frame members 30 and 31 by any preferred means. Said plate 95B is provided with a plurality of slots 95C extending longitudinally of the machine, which slots 95C have extending upwardly therethrough the stops 95D. Said stops 95D are carried by a cross bar 95E, which underlies the plate 95B. Said cross bar 95E is carried by a pair of racks 95F—95F having downwardly presented teeth adapted to mesh with a pair of pinions 95G—95G, which pinions are fast upon a shaft 95H, which shaft is journaled in the side frames 30 and 31. The shaft 95H is provided at one extremity thereof with the notched wheel 95I and with the finger grip 95J. The wheel 95I may be provided with any desired number of notches 95K adapted to selectively receive a spring-pressed detent 95L. It will be understood without detailed explanation that the effective position of the stops 95D of the margin bar 95A may be varied at will by turning the finger grip 95J. The detent 95L will hold the wheel 95I and consequently the stops 95D in adjusted position. By reason of the rack and pinion construction at the two sides of the machine, the desired alignment of the stops 95D transversely of the machine will be had at all times.

The details of construction of the margin bar 95A are not the invention of the present applicant and are not claimed per se in this application.

The carriage 43 is provided with the platen roller 99 and the pressure roller 100, the pressure roller being rotatably carried by the side walls 45 and 46 (see Fig. 3) and the platen roller 99 being rotatably carried by the platen roller yoke, which is indicated as a whole by the numeral 102. Said yoke comprises the side walls 103—103 and the cross bar 104. The platen roller 99 in the illustrated embodiment of the present invention is free to rotate and is adapted to float in a universal manner.

The side walls 103—103 of the platen roller yoke 102 (Fig. 6) are provided with aligned holes indicated by the numeral 105 adapted to receive the reduced extremities 106 of the platen roller 99. One of said extremities 106 may be readily removable for ease of assembly and disassembly. Sufficient clearance is provided between the reduced extremities 106 of the platen roller 99 and the cylindrical walls of the holes 105 to permit a resiliently controlled floating action of the platen roller 99. The floating action referred to is controlled by the plunger 107, which is spring-pressed toward the axis of the platen roller 99 by means of the spring 108, the outer extremity of which spring 108 is abutted by the screw 109, which may be locked in position by means of the locking screw 110. The line of thrust of each plunger 107 in the two side walls 103—103 is directed in a line approximately symmetrical with the two adjusting screws 111—111, which screws 111—111 are, in the illustrated embodiment of the present invention, set at an angle of approximately 90 degrees with each other. Said adjusting screws 111—111 are locked in place by means of setscrews 112—112. It will be understood without detailed explanation that by properly positioning the adjusting screws 111—111 the platen roller 105 may be held yieldably in parallel relationship with the pressure roller 100, but that if paper of non-uniform thickness should be disposed between said platen roller 99 and the pressure roller 100 the platen roller 99 may readily adjust its position to compensate for such non-uniformity of paper thickness. This adjustment of the platen roller 99 will be had not only with respect to the pressure roller 100 but also with the bed plate 92.

The pressure roller 100 is rotatably carried by the carriage 43, its left-hand extremity as the parts are viewed in Figure 3 being provided with a cylindrical hole 113, which rotatably receives the extremity 114 of a pin 115. Said pin 115 is screw-threaded into the side wall 45 of the carriage assembly 43 and is provided with a lock nut 116 and a lock washer 117. The right-hand extremity of the pressure roller 100 as the parts are viewed in Figure 3 is provided with a cylindrical hole 118. Extending diametrically through said hole is the pin 119 adapted to be embraced within the forked extremity of a pin 120, which pin constitutes an extremity of a gear 121, the functions of which will be referred to presently. Said gear 121 is provided with a cylindrical axial hole 122, which receives the extremity 123 of a pin 124. Said pin 124 is screw-threaded into the wall of the housing 48 and is provided with a lock nut 125. Said pin 124 intermediate of its length is provided with the enlarged portion 126, which through the medium of a washer 127 exerts a force against the wall of the housing 48. Said enlarged portion 126 forms a bearing for a toothed sector 128 (Fig. 5), which meshes with the sector 129. Said sector 129 has a bearing upon a shaft 130, which, with the shaft 131 disposed coaxially with said shaft 130, is secured to the platen roller yoke 102 and is rotatably carried by the carriage assembly 43 to swingingly support the handle arm yoke 102 within said assembly 43. The sector 129 has rigidly secured thereto the bearing portion 132, which provides an extensive bearing surface upon the shaft 130.

Reference may now be had to Figures 3 and 5 for a disclosure of the mechanism for operating the pinions and sectors above referred to. The pinion 55 has a pinion 133 rigid therewith, both pinions being keyed to the shaft 54. Encircling the shaft 54 at its right-hand extremity as the parts are viewed in Figure 3 is the bushing 134, which may be rotatably carried by the adjacent wall of the housing 48. Said bushing 134 is flanged at its left-hand extremity as the parts are viewed in Figure 3, as indicated by the numeral 135. Said flange 135 provides one side bearing for a strap 136, the other side bearing being provided by the boss 137 on the housing 48. Said strap 136 is rotatable about the axis of the shaft 54, being preferably rigid with the bushing 134. Said strap 136 rotatably carries the idler pinion 138 (Fig. 5) and also swingingly carries the link 139. Said link 139 is connected with one extremity of the toothed sector 128, which, it will be noted from Figure 5, takes a bell-crank conformation. Said pinion 138 meshes with the pinion 140 carried by the toothed sector 128.

From an inspection of Figure 5 it will be noted that when the shaft 130 is rotated, a driving motion is communicated to the sectors, links and gears connected thereto. By way of example it may be pointed out that when the shaft 130 is rotated in a clockwise direction as the parts are viewed in Figure 5 a clockwise movement will be communicated to the toothed sector 129, which will communicate a counter-clockwise swinging movement to the bell-crank-shaped toothed sector 128, swinging said toothed sector 128 about the pin 124 as an axis. This action will move the link 139 to the left, thereby communicating a movement of translation to the pinion 138 about the axis of the pinion 133. Inasmuch as the pinion 133 is stationary at this time, the pinion 138 will have a planetary action relative to the axis of the pinion 133 and will be rotated in a counter-clockwise direction as the parts are viewed in Figure 5, thereby communicating a clockwise rotation to the pinion 140. This clockwise rotation of pinion 140 will communicate a counter-clockwise rotation to the pinion 121, which, it will be noted from an inspection of Figure 3, is non-rotatably connected to the pressure roller 100. Consequently rotation of the shaft 130 in a clockwise direction will communicate a counter-clockwise movement of rotation to the pinion 121, or, expressed in other language, will communicate a counter-clockwise direction of rotation to the pressure roller 100 coaxially disposed with said pinion 121.

As noted above and as shown in Figure 3, the platen roller yoke 102 is rigidly connected with the shaft 130, so that operation of said platen roller yoke will communicate a rotative movement to said shaft 130. Said yoke is provided with the handle 141 for communicating a swinging movement to said yoke and consequently to said shaft 130. The driving relationship accomplished by the train of toothed sectors and pinions, as above described, has a valuable function of feeding the paper into the margin bar 95 when the platen roller 99 is moved to its operative position.

The action of the pressure roller 100 and the platen roller 99 during the downward movement of the platen roller yoke 102 will be clear from an inspection of Figures 8A, 8B and 8C. Figure 8A represents conditions in which the platen roller 99 is up out of operative position, and a sheet of paper, indicated by the character 95X, is located with its forward margin in the margin bar 95, said sheet of paper resting upon the pressure roller 100. With the carriage still, and with the platen roller yoke 102 having a clockwise movement as the parts are viewed in Figures 8A, 8B and 8C, a counter-clockwise direction of rotation will be communicated to the pressure roller 100 as described above. The platen roller 99 is shown with a dot, indicated by the character 99A, and the pressure roller is shown with a dot 100A, which dots indicate diagrammatically relative rotations which may be communicated to said platen roller 99 and said pressure roller 100. When the platen roller yoke 102 has reached a position such as indicated in Figure 8B, the dot 100A of pressure roller 100 will have been moved in a counter-clockwise direction from the point indicated in Figure 8A. However, the dot 99A of the platen roller 99 will not have moved during this range of movement, inasmuch as there is no driving relationship with the platen roller 99 to cause said dot to move. Under these conditions the sheet of paper 95X is gripped between the platen roller 99 and the pressure roller 100. As the platen roller yoke 102 is moved down into proximity to the gelatin band 94, such continued movement will communicate further driving movement in a counter-clockwise direction to the pressure roller 100, as clearly indicated in Figure 8C. One effect of this counter-clockwise rotation of the pressure roller 100 is to provide the sheet of paper 95X with a slight loop, indicated by the numeral 95Y. As is well known in the art, this loop is very valuable in avoiding the wrinkling of the paper upon the gelatin band and for insuring the snug fit of the sheet of paper within the angle of the margin bar 95. The tendency of the pressure roller 100 in its counter-clockwise rotation to communicate a clockwise rotation to the platen roller 99 is compensated for by the fact that the planetary action of the platen roller 99 about the axis of the pressure roller 100 tends to set up a counter-clockwise rotation in said platen roller 100, the net effect being, according to practice at present preferred, a substantial absence of rotation of the platen roller 99, or, if preferred, a slight counter-clockwise rotation of the platen roller 99. Figure 8C illustrates the dot 99A displaced in the counter-clockwise direction a small amount from its position in Figures 8A and 8B.

A further advantage of the geared construction between the platen roller yoke and the pressure roller 100 is that when the platen roller is down in its operative position the gears for communicating a driving movement to the pressure roller during the travel of the carriage 43 are in proper engagement, whereby effects of backlash at the beginning of the rearward travel of the carriage are eliminated.

A further advantage is that when the carriage is being returned to its home position and is stripping the sheet of paper 95X from the gelatin band 94, the geared connection between the platen roller yoke and the pressure roller gives a last positive stripping movement of rotation to the pressure roller 100 when the platen roller yoke is raised from its operative to its inoperative position.

It will also be clear from an inspection of Figure 5 that movement of the carriage along the machine will, by reason of the engagement of pinion 55 with the rack 34, cause a turning movement of the pinion 133 which is rigid with said pinion 55. Under these conditions, that is—when the carriage is being moved along the bed of the machine, a turning movement will be communicated from the pinion 133 through the pinion 138, pinion 140 and pinion 121 to the pressure roller 100, thereby positively rotating said pressure roller 100 during the operative movements of the carriage, resulting in the proper application of the sheet of paper to the gelatin band and the proper stripping of said sheet of paper from said gelatin band.

The numeral 142 (Figs. 5 and 6) indicates a paper guide for directing sheets of paper between the pressure roller 100 and the platen roller 99 (when said platen roller is up out of operative position) into the corner of the margin bar 95.

Under ideal conditions the plane which includes the operative surface of the paper guide 142 and the paper receiving corner of the margin bar 95 should be tangent to the pressure roller 100 on the upper side of said pressure roller 100. Under conditions of manufacture, due to rough or distorted castings or due to adjustment of the position of the front stop of the machine, to be described hereinafter, it may be found that this desirable coplanar relationship between the paper guide, the paper receiving corner of the margin bar and the upper surface of the pressure roller 100 is not possible. The present invention contemplates adjustability of the paper guide 142 to approximate as nearly as possible the ideal conditions referred to. By reference to Figures 2 and 6 it will be noted that the paper guide 142 is swingingly connected to the two side walls 45 and 46 of the carriage assembly 43 by means of the bolts 143—143, which are coaxially disposed relative to each other. The preferred angular position of the paper guide 142 may be had through a pin and slot connection on either side of the carriage 43, a slot for the purpose being indicated by the numeral 144 and a pin riding in said slot being indicated by the numeral 145. Said slots 144 are disposed in upstanding flanges 146 of the paper guide 142.

By reference to Figures 1, 2, 6 and 8 understanding may be readily had of certain side guide members which cooperate with the paper guide 142 for accurately positioning sheets of paper transversely of the carriage 43. Two of said side guide members are illustrated in Figure 2 and bear the numerals 147 and 148. It will be noted that the side guide member 147 is provided with an upstanding flange 149, which limits movement of a sheet of paper toward the left side of the carriage. The side guide member 148 is provided with the upstanding flange 150, which limits its movement of a sheet of paper toward the right side of the carriage. The two side guide members 147 and 148 are similar except that one is complementary to the other. A description of one will suffice for a description of both. Each of said side guide members 147 and 148 comprises a flat portion 151 adapted to lie flatwise against the inclined surface of the paper guide 142. Each of said side guide members is turned over at its lower extremity to provide a hook-shaped formation, indicated by the numeral 152, adapted to hook over the lower extremity of the paper guide 142. Each of said side guide members is provided at its upper extremity with a flange 153 disposed at right angles with the portion 151 thereof. Riveted or otherwise secured to said flange 153 is a bowed sheet metal spring 154, said spring in the illustrated embodiment of the present invention being secured to the flange 153 by means of a rivet 155. Said rivet is preferably located symmetrically with reference to the length of said spring 154 and has a rather loose connection with said spring 154, whereby said spring may be self-aligning. Said spring exerts a force between the flange 153 of the side guide member and the down-turned flange 156 of the paper guide 142, resulting in snugly holding the hooked over lower portion of the side guide member in cooperative relationship with the lower edge of the paper guide 142. The bowed spring 154 is of a dimension such that a portion of its width overhangs the downwardly extending flange 156 of the paper guide 142. Said spring 154 is severed adjacent to its extremities to provide portions 157—157, which underlie the flange 156 of the paper guide 142, thereby preventing the accidental lifting of the side guide member 147 or 148 from the upper surface of the paper guide 142. By reason of the action of the spring 154, each of the side guide members 148 is held in snug relationship with the paper guide 142, but may be readily moved to any position transversely of the carriage 43 within the limits of said carriage.

Under operating conditions difficulties in registration have hitherto been encountered in operating upon printed forms due to differences in the marginal edge of said printed forms adjacent to the margin bar 95. To compensate for these differences the present invention contemplates the adjustability of the front stop for the carriage 43. The present invention contemplates a front stop which may be rigidly connected with the guide rod 42. Such a front stop is indicated by the numeral 158. Said front stop 158 in certain embodiments of the present invention is adjustable along the length of said guide rod 42. Said front stop also has valuable functions in providing a carriage lock, which functions will be referred to in detail hereinafter. For the present, however, the front stop 158 may be considered as a rigid portion of the guide rod 42. The desired adjustment of said front stop 158 is secured by longitudinal adjustment of the guide rod 42. In order to permit this adjustment without the possibility of turning of the rod 42, preferably the rear extremity of said guide rod is slotted, as indicated by the numeral 159 in Figure 2. The bracket 40 is provided with a setscrew 160 adapted to have its extremity ride in said slot 159. The bracket 41 at the forward extremity of the machine is provided with an adjusting screw 161 (Figs. 1, 2, 3 and 7), which adjusting screw is rotatably mounted within said bracket 41. In order to prevent longitudinal movement of the adjusting screw 161 relative to the bracket 41, said screw may be provided with the collar 162 rigid therewith. The outer extremity of said screw 160 may have threaded thereon the knob 163, which knob may be rigidly secured to said screw 160 by means of a setscrew 164. The portion of the adjusting screw 161 within the bracket 41 may be provided with a plurality of circumferentially spaced depressions, indicated by the numerals 165—165. Threaded into the bracket 41 in a position radially disposed relative to the adjusting screw 161 is the cup 166 which houses a detent 167 spring-pressed toward the adjusting screw 161 by means of the spring 168. It will be clear without detailed explanation that when the knob 163 is turned the spring-pressed detent 167 will yieldably locate said adjusting screw 161 at definite steps throughout its movement of rotation. The depressions 165—165 will preferably be equally spaced, so that said definite steps will be uniform. Said adjusting screw 161 is threaded into a hole 169 in the adjacent extremity of the guide rod 42. By turning the knob 163, a turning movement will be communicated to the adjusting screw 161, which will provide longitudinal adjustment of the guide rod 42. Inasmuch as the front stop 158 is fixed longitudinally of the guide rod 42, this adjustment of the guide rod 42 will provide adjustment, longitudinally of the machine, of the front stop 158.

The means for locking the carriage in the home position, as well as the means for locking and unlocking the platen roller, will now be described, reference being had particularly to Figures 3, 4, 5, 7, 9, 10 and 15. By reference to Figure 3 it will be noted that the front stop 158 is provided with a stop plate 170, which stop plate is rigidly connected to said front stop 158. Said stop plate 170 is provided with an aperture 171, which has communicating therewith an arcuate slot 172 of less width than the diameter of said aperture 171. Said aperture 171 is of sufficient size to receive the head 173 of a pin 174, which pin is so mounted relative to the guide rod 42, in a manner to be described hereinafter, that it has a movement in a direction parallel with the length of said guide rod 42 and under certain conditions a movement of translation about the axis of said guide rod 42. The width of said slot 172 is less than the diameter of the head 173 of said pin 174 and the length of said slot is sufficient to permit the swinging of the whole carriage assembly 43 about the axis of the rod 42 throughout its range. It may be stated at this point that in the functions of the illustrated embodiment of the present invention the head 173 is presented to the aperture 171, passes through said aperture, is given a movement of translation about the axis of the guide rod 42 for a sufficient distance to cause said head 173 to move out of registry with the aperture 171 into overlying relationship with the walls of the arcuate slot 172. Said pin 174 is rigid with a plate 175, which plate is secured to the sleeve 70 slidable and rotatable upon the guide rod 42. The plate 175 secured to the sleeve 70 is adapted to abut flatwise against the plate 170 carried by the front stop 158. Said sleeve 70 is provided at its rear extremity with a collar 177, which is counter-sunk as indicated by the numeral 178, for the reception of the extremity of said sleeve. Said collar is counter-sunk on the other side, as indicated by the numeral 179, for the reception of a coil spring 180, which encircles the guide rod 42. The other extremity of said spring 180 encircles the bushing 66 of the rearmost bushing assembly 65. By reason of this construction the coil spring 180 is held out of contact with the guide rod 42, whereby the danger of marring said guide rod 42 by said spring 180 is avoided. As noted hereinabove, the sleeve 70 is provided with a plurality of cam slots 71, which receive the reduced portions 69—69 of the pins 68, which pins are rigid with respect to the housing 48. As said sleeve 70 is moved longitudinally relative to the housing 48 the walls of said slots 71, by reason of their engagement with the portions 69, communicate a movement of rotation to said sleeve. When said sleeve 70 is projected by the spring 180 to the forward limit of its range of movement, the head 173 of the pin 174 carried by the plate 175 will be at the limit of its movement in a counter-clockwise direction as the parts are viewed in Figure 4, in which position said head 173 will line up with the aperture 171 of the plate 170 rigid with the front stop 158. Under these conditions said head will enter said aperture 171. Under these conditions the plate 175 will be located in flatwise engagement with the plate 170. Continued movement of the carriage 43 with the housing 48 forwardly will put the spring 180 into a state of compression, and the energy stored up in said spring 180 will overcome the resistance between the plates 175 and 170, causing the plate 175 to rotate, carrying the head 173 of pin 174 out of registry with the aperture 171 into overlying relationship with the walls of the arcuate slot 172.

Figure 15:
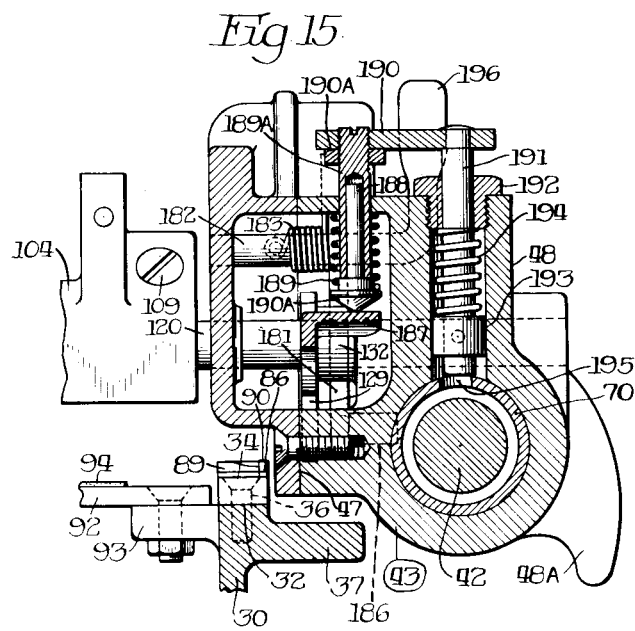
Figure 15 is a sectional view taken along the plane indicated by the arrows 15—15 of Figures 1, 2, 3 and 7.
Figure 19:
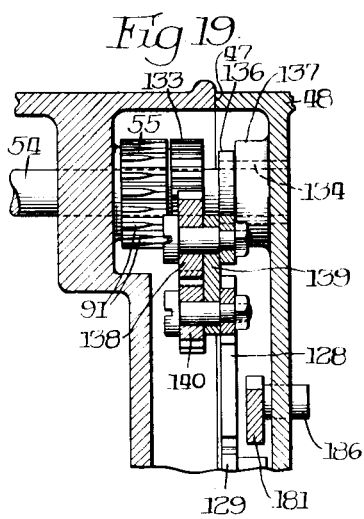
Figure 19 is a sectional view taken along the planes indicated by the arrows 19—19 of Figure 5.
Figure 16:
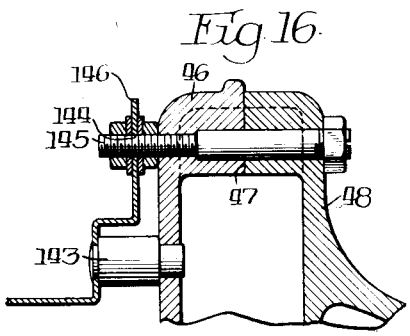
Figure 16 is a sectional view taken along the planes indicated by the arrows 16—16 of Figure 6.

By reference to Figure 5 it will be noted that a latch member 181 is provided which is swingingly mounted relative to the wall 46 of the carriage 43. Said latch member 181 is secured to the pin 182, which has a bearing in suitable bushings in said wall 46 and the adjacent wall of the housing 48. Said latch member 181 is spring-pressed in a clockwise direction as the parts are viewed in Figure 5 by the spring 183, which has an abutment against a portion of the carriage 43. The latch member 181 is provided with the shoulder 184 adapted to engage an abutment 185 carried by the toothed sector 129 above referred to, which toothed sector 129 is rigidly connected to the axis of the shaft 130, to which is rigidly connected the platen roller yoke 102. It will be understood that when the latch member 181 is swung to the limit of its movement in a clockwise direction it may have latching engagement with the abutment 185, holding said abutment downwardly and latching the platen roller yoke 102 in its lowermost position. Said yoke 102 is provided with setscrews 184A (see Fig. 6) adapted to abut adjacent parts of the frame of the carriage 43 for limiting the downward movement of said yoke 102, whereby it will be impossible for the operator to exert an excessive force downwardly upon the gelatin band. The force applied to the platen roller 99 against the paper on the gelatin band 94 is due to the springs 108—108. In order to insure that the shoulder 184 will release itself from the abutment 185 when the latching member 181 is moved in a counter-clockwise direction, said shoulder 184 should be so designed that a line drawn normal thereto will slant to the right of the axis of swing of the latching member 181 as the parts are viewed in Figure 5. In other words, to make the release of the latching member 181 as easy and accurate as possible, the relation of the contacting surfaces of the abutment 185 and the shoulder 184 must be such that they will engage and release without a cam action. The lower extremity of the latching member 181 is provided with the pin 186, which, as shown in Figure 3, is adapted to abut against the collar 177 on the rear side of said collar. The left-hand extremity of the toothed sector 129 as the parts are viewed in Figure 5 is provided with a shelf 187 adapted to be engaged by the extremity of the pin 188, which pin is spring-pressed downwardly by means of the spring 189. Said pin 188 telescopes within the sleeve 189A, which sleeve is threaded into a finger release 190. The position of said sleeve 189A relative to said finger release 190 may be adjusted by turning said threaded sleeve 189A. After having been adjusted, the threaded sleeve 189A may be locked relative to the finger release 190 by means of the lock nut 190A. Said pin 188 is provided with the head 190B adapted under predetermined conditions to engage the lower extremity of said sleeve 189A after said head 190B has compressed the spring 189 to a predetermined extent. Said spring 189 through its action against the head 190B of the pin 188 tends to swing the toothed sector 129 in a counter-clockwise direction as the parts are viewed in Figure 5 and consequently urges the platen roller yoke 102 and the handle 140 in a counter-clockwise direction as the parts are viewed in said figure, that is—in a direction to hold the platen roller 99 out of operative position. Also connected to the finger release 190 is the pin 191 (Fig. 15), which pin 191 has a movement of reciprocation within a bushing 192 screw-threaded into the housing 48. Said pin is provided with a collar 193 rigidly secured thereto. A spring 194 encircles the pin 191 between the bushing 192 and the collar 193, tending to urge said pin 191 downwardly as the parts are viewed in Figure 15. In other words, the finger release 190 and the pin 191 are urged downwardly by the spring 194. The lower extremity of pin 191, as the parts are viewed in Figure 15, is adapted under predetermined conditions to register with the hole 195 in the sleeve 70.

The predetermined conditions referred to are when the carriage 43 is in its extreme forward, that is—its home, position. Under these conditions the spring 194 holds the pin 191 in registry with the hole 195, effectually locking the sleeve 70 in its extreme forward position. As noted above, said sleeve 70 has secured to its forward extremity the plate 175, which carries the pin 174, having the head 173. As also described above, when the carriage is in its extreme forward position, said head 173 is in overlapping relationship with the wall of the slot 172. Under these conditions, therefore, the carriage 43 is locked in its extreme forward position, that is—home position. Under these conditions there is no tendency for the carriage to move away from its forward or home position while a sheet of paper is being inserted into said carriage. Therefore correct registration is had between the sheet of paper being inserted into the carriage and the margin bar 95. Expressed in other language, the carriage 43 is locked in its home position as long as the platen roller 99 is out of operative relationship with the paper upon the gelatin band 94. By adjustment of the sleeve 189A the proper timed relationship between the release of the sleeve 70 and the engagement of the platen roller 99 with the sheet of paper upon the gelatin band 94 may be predetermined. In practice the contact of the platen roller 99 (which as described above is a floating platen roller) occurs slightly in advance of the release of the sleeve 70. After a slight floating action of the platen roller 99 has occurred, the abutment 185 carried by the toothed sector 129 (Fig. 5) will be depressed sufficiently to allow the latch 181 to engage thereover, whereby said toothed sector is latched in its extreme clockwise position as the parts are viewed in Figure 5; it being noted that the latch 181 is normally urged in a clockwise direction by the spring 183. At this point it may be mentioned that the latch 181 is provided with the finger release 196, whereby said latch 181 may be released at any time regardless of the position of the carriage along the bed of the machine.

The construction described above, through the co-action of the latch 181 with the toothed sector 129 connected to the platen roller yoke 102, has the effect of latching the platen roller yoke in operative position when the handle 141 has been operated in a clockwise direction as the parts are viewed in Figure 5. This latching engagement between the latch 181 and the abutment 185 on the toothed sector 129 will continue during the rearward movement of the carriage and the return movement of said carriage toward home position. During the operative movement of the carriage the spring 180 will hold the plate 175 (Fig. 3) in its outermost position, under which conditions the reduced extremities 69 of the setscrews 68, by reason of their engagement with the cam slots 71 in said sleeve 70, will hold the head 173 of the pin 174 in alignment with the aperture 171 (Fig. 4) of the plate 170 attached to the front stop 158. After the plate 175 carried by the sleeve 70 has contacted with the plate 170 and the head 173 has entered said aperture 171, the spring 180 will be compressed, thereby causing a reaction between the extremities 69 of the set screws 68 with relation to the tapered slots 71 in said sleeve 70, whereby said sleeve and consequently the plate 175 will be given a movement of rotation whereby the head 173 of the pin 174 will be moved into overlapping relationship with the walls of the slot 172 in plate 170, thereby locking said sleeve in its extreme forward position. As explained above, continued forward movement of the carriage 43 will result in further compression of the spring 180, allowing the pin 191 to enter the hole 195 in said sleeve 70, thereby locating the carriage 43 in its extreme forward or home position. The compression of the spring 180 has the effect of cushioning the blow between the plate 175 attached to the sleeve 70 and the plate 170 attached to the front stop 158, thereby minimizing shock and noise. As explained above, when the carriage is at its home position the pin 186 carried by the latch 181 is engaged by the collar 177, which moves with the sleeve 70, thereby moving the latch 181 to unlatching position and allowing the platen roller 99 to move upwardly away from the gelatin band 94. This action also moves the platen roller 99 away from the pressure roller 100. After a new sheet of paper has been inserted between the pressure roller 100 and the platen roller 99, the handle 141 and consequently the platen roller yoke 102 will be swung in a clockwise direction as the parts are viewed in Figures 5, 6 and 7, allowing the latch 181 to be sprung into latching relationship with the abutment 185 on the toothed sector 129. In the operation of the described embodiment of the present invention no wrist movement is required on the part of the operator in operating the handle 141 in its clockwise or counter-clockwise direction. A simple movement of said handle in a direction parallel with the length of the machine is sufficient not only to move the carriage 43 longitudinally of the machine but to swing the platen roller yoke 102 as well. When the handle 141 has been swung sufficiently far in a clockwise direction as the parts are viewed in Figure 5 to cause the platen roller 99 to contact with the paper upon the gelatin band 94 and has caused a floating action of said platen roller 99, there has resulted the uplifting of the shelf 187 of the toothed sector 129, resulting in the compression of the spring 189 and the contacting of the head 190B of the pin 188 with the lower extremity of the sleeve 189A, and the application of a lifting force to the finger release 190. Upward movement of the finger release 190 is resisted by the spring 194 (see Fig. 15). As indicated above, the proper timed relationship between the action of the head 190B of the pin 188 with the sleeve 189A adjustably secured to the finger release 190 may be adjusted by turning said sleeve 189A, which is threaded for that purpose. The parts will be so adjusted that at the proper instant the lifting force applied to said finger release 190 will overcome the effect of spring 194, resulting in the uplifting of the finger release 190, withdrawing the pin 191 from the hole 195 in the sleeve 70, thereby unlocking said sleeve. It should be noted at this point that there is a certain amount of lost motion between the head 190B and the lower extremity of the sleeve 189A whereby the lifting effect applied to said sleeve 189A occurs only during the last increment of movement of the shelf 187, that is—during the time that the platen roller is approaching its lowermost or operative position. After the pin 191 has been released from the sleeve 70, the spring 180, being in a state of compression at this instant, will exert a force rearwardly upon the carriage 43. Relative movement between the housing 48 and the sleeve 70 will result in a turning movement of the sleeve 70 by reason of the engagement of the reduced extremities 69 of the setscrews 68 with the walls of the cam slots 71. This turning movement will move the head 173 of the pin 174 in a counterclockwise direction as the parts are viewed in Figure 4, moving said head into registry with the aperture 171, thereby unlocking the carriage 43 and allowing the movement thereof in the rearward direction.

The present invention contemplates an adjustable margin bar carried by the carriage. As is well recognized in the art to which the present invention appertains, there is a certain amount of danger in marginless work, as hitherto practiced, of marring the gelatin band due to the snap action of the paper when the forward marginal edge of the paper is allowed to come into contact with the gelatin band. For this reason it is preferred, when it is not necessary to print to the extreme forward marginal edge of the paper, to maintain said forward marginal edge upon the margin bar. The present invention contemplates an automatic margin bar carried by the carriage, which margin bar is movable in response to movement of the carriage handle, the initial position of the automatic margin bar being adjustable whereby when a full margin is permissible at the forward edge of the paper, said edge of the paper, when the margin bar is withdrawn, will not contact with the gelatin surface, said paper contacting with the forward extremity of the operative portion of the gelatin band at a region short of the marginal edge of said paper. When a medium margin, say for example one-eighth of an inch, is permissible at the forward edge of the paper, the contact between the platen roller and the paper, when the platen roller is in operative position, is relatively distant from the forward marginal edge of the paper, so that the snap action of the edge of the paper into contact with the gelatin band is not destructive to said gelatin band. When it is necessary to print to the extreme forward marginal edge of the paper it is of course necessary that said extreme edge of the paper shall come into contact with the gelatin surface, but even under these conditions the snap action is reduced to a very considerable extent, minimizing the destructive action upon the gelatin band.

A further and still more important advantage of the automatic margin bar construction contemplated by the present invention is the following. As is well known, stenographers with typewriting machines in common use have certain difficulties in typing to the extreme marginal edge of their sheets of paper, which sheets may be used as master copies for the hectograph operation. Stenographers prefer for their own convenience to stop short of the extreme marginal edge of the paper upon which they are typing. When hectographic copies are being made of these typewritten sheets of paper, however, it is frequently very desirable that the typewritten copy extend to the extreme marginal edge of the hectographic copies. By means of a simple adjustment, hectographic copies having the copied matter extending to the extreme marginal edge may be made from master sheets in which the copy stops short of the extreme marginal edge of the paper.

A further decided practical advantage of the automatic margin bar forming part of the present invention is the following. Very frequently hectographic copies are made upon printed forms having printed matter at one end of the form, the other end of the form being free for the copy to be made by the hectographic process close to the end margin thereof. Under these conditions it will suit the purpose of the operator of the hectograph machine if the stenographer will leave a margin at the typed extremity of her master copy. The operator of the hectograph machine may so adjust the automatic margin bar according to the present invention that the end of the typed copy upon the master sheet may be located close to the extremity of the operative portion of the gelatin band. Having impressed the master copy upon the gelatin band, the master copy may be readily stripped by hand from the gelatin band over the front of the machine, and the position of the automatic margin bar may then be adjusted so that when hectographic copies are made only the desired margin beyond the end of the typed subject matter will be had. In the case of the printed forms referred to it will not be necessary or desirable to roll said forms onto the gelatin band to the extreme rearward edge of such forms as they are laid out upon the gelatin band. Consequently such forms, after having been laid out upon the gelatin band in the hectographic operation, will be automatically stripped from the gelatin band in the normal operation of the carriage.

The structure involving the automatic margin bar is illustrated in Figures 9, 10, 11, 12, 13 and 14. Referring to said figures, the platen roller 99 is operated by means of the handle 141. As previously described, the handle arm 141 operates the platen roller yoke 102, which is carried by the aligned shafts 130 and 131 journaled in the frame of the carriage 43. As previously described, said platen roller yoke includes the side arms 103—103, in which the platen roller 99 is journaled, the journaled construction being such that said platen roller 99 has a coating action with respect to the arms 103—103. The numeral 197 indicates an automatic margin bar having the arms 198—198, which arms are secured to the shafts 199 and 200, of which the shaft 199 is journaled in the side wall 45 of the carriage and of which the shaft 200 is journaled in the side wall 46 of the carriage 43. The shaft 200 is also journaled in a wall of the adjacent housing 48. The handle 141 has a driving connection with the shaft 200, which will be described presently. By reason of this driving connection between the handle 141 and the shaft 200 it is convenient to provide adjustability between the automatic margin bar 197 and the shaft 200. For this purpose a pair of setscrews 201 and 202 are provided, which setscrews are spaced longitudinally of the shaft 200, but have their axes in angular relationship with each other. Said setscrews 201 and 202 cooperate with flat portions 203 and 204 on the shaft 200. The flat surfaces 203 and 204 are so disposed relative to the ends of the screws 201 and 202 that said setscrews 201 and 202 have tendencies to turn the cooperating arm 198 relative to said shaft 200, said setscrews 201 and 202 having opposing effects. It will be understood without detailed explanation that by backing up on one of said setscrews and turning up upon the other thereof, the position of the adjacent arm 198 may be adjusted relative to the shaft 200. Inasmuch as the margin bar 197 and its two arms 198—198 are a rigid structure, the adjustability of one of the arms 198 relative to the shaft 200 produces adjustability of the entire margin bar 197 relative to said shaft 200. After having once been adjusted, it will not ordinarily be necessary to change the adjustment of the margin bar 197 relative to said shaft 200. The shaft 199 may be secured to the adjacent arm 198 in any preferred manner. The drawings show the shaft 199 secured to the adjacent arm 198 by means of a setscrew 205, this being preferred shop practice for the purpose of providing interchangeability of parts.

Non-rotatably secured to the shaft 130 is the toothed sector 129 previously described. Said toothed sector in the embodiment of the present invention illustrated in Figures 9, 10, 11, 12, 13 and 14 is provided with the pin 206, which has certain functions in controlling the operation of the automatic margin bar 197. The numeral 207 indicates a bushing upon the shaft 130, which bushing has rigidly secured thereto the resilient setting device 208, which setting device has an ear 209 projecting from one side thereof, which ear is adapted to be located in one or another of the notches 210—210 in the sector 211, which sector has its two extremities secured to the adjacent wall 46 of the carriage 43. By locating the ear 209 of the setting device 208 selectably in one or another of the notches within the sector 211, the circumferential position of the bushing 207 on the shaft 130 may be adjustably determined. Said bushing 207 at one of its ends is provided with teeth 212 adapted to engage in corresponding notches in the adjusting plate 213, which adjusting plate 213 is swingingly supported by the shaft 130. Extending laterally from the plate 213 is the pin 214. Said pin 214 provides a bearing for a flanged plate 215, the flanges of which are indicated by the numerals 216—216. The pin 206 rigid with the toothed sector 129 is adapted to move between said flanges 216—216, providing a lost motion connection between said toothed sector 129 and the flanged plate 215.

From an inspection of Figure 13 it will be noted that the flanged plate 215 is provided with the pin 217 extending laterally therefrom. Rotatably disposed upon said pin 217 is the link 218, which link is articulated to the member 219 fast to the shaft 200. The outer extremity of the link 218 as the parts are viewed in Figure 10 is provided with a flat surface 220 adapted to be abutted by a compression spring 220A housed within a recess in the member 219. Mounted in the link 218 is the setscrew 221 having a projecting end adapted to abut against a downwardly presented surface 222 of the member 219.

A mode of operation of the automatic margin bar 197 and its associated parts is substantially as follows. With the handle arm 141 in its forward position, that is—its extreme counter-clockwise position as the parts are viewed in Figure 12, the platen roller 99 will be in its inoperative position, spaced from the pressure roller 100. A sheet of paper may then be inserted between the platen roller 99 and the pressure roller 100, finding lodgment in the angle of the margin bar 197. Under the conditions assumed, the setting device 208 is in a mid position, and under these conditions the margin bar 197 will be in a mid position relative to its range of angular adjustment. As noted above, the margin bar 197 is mounted to swing about the axis of the aligned shafts 199 and 200. The paper positioning location of the margin bar 197 may be adjusted by adjustment of the setting device 208. Under the conditions assumed, in which the setting device is in a mid position, after a sheet of paper has been positioned upon the margin bar 197, the handle 141 will be swung in a clockwise direction as the parts are viewed in Figure 12, moving the platen roller 99 down into contact with the sheet of paper, forcing said sheet of paper toward the gelatin band 94. As the handle 141 is moved in a clockwise direction as the parts are viewed in Figure 12, it will communicate a clockwise movement to the toothed sector 129. Inasmuch as said toothed sector 129 is provided with the outstanding pin 206, said pin 206 will move away from the upper flange 216 of the plate 215 toward the lower flange 216 thereof. After said pin 206 has engaged the lower flange 216, said plate 215 will be moved in a clockwise direction as the handle 141 is moved further in a clockwise direction, which will pull the link 218 downwardly and to the left as the parts are viewed in Figure 12. This will have the effect of turning the member 219 in a clockwise direction. This effect is resisted to a certain extent, however, by the spring 220A, the net result being that the member 219 with its shaft 200 and the margin bar 197 are turned gradually in a clockwise direction, moving the margin bar 197 out of cooperative relationship with the sheet of paper. By reason of the resilient connection between the link 218 and the member 219, sheets of paper or cardboard of different thicknesses may be accommodated. The parts will be so designed that the platen roller 99 will cause engagement between the sheet of paper and the gelatin band 94 slightly in advance of the time when the margin bar 197 is withdrawn. After the carriage has been run out upon the sheet of paper and has been returned to its home position, the handle 141 will be swung in a counter-clockwise direction toward the position illustrated in Figure 12, which will raise the platen roller 99 and permit the withdrawal of said sheet of paper. Under these conditions the setscrew 221 limits the effect of the spring 220A in exerting a force against the link 218. The setscrew 221 therefore marks the beginning of the sequence of operations above described, in moving the platen roller 99 toward the gelatin band 94, whereby differences which may occur in commercial manufacture may be compensated for. Expressed in other language, the setscrew 221 insures that the margin bar 197 will not be thrust in a counter-clockwise direction as the parts are viewed in Figure 12 beyond its proper adjusted position.

As indicated above, the parts are illustrated in Figures 10, 11 and 12 for a mid position of the margin bar 197. If it is desired to adjust the initial paper locating position of the margin bar 197, the resilient setting device 208 will be moved. Movement of the setting device 208 in a counter-clockwise direction as the parts are viewed in Figure 10 will have the effect of turning the adjusting plate 213 in a counter-clockwise direction as the parts are viewed in Figure 10, moving the pin 217 of the plate 215 to the left as the parts are viewed in Figure 10, which will communicate a pull to the left of the link 218, which through the setscrew 221 will move the members 219, 200 and 197 to a position retracted in a clockwise direction from those indicated in Figure 12. There is thereby provided a new initial setting for the margin bar 197. A setting of the device 208 at its extreme counter-clockwise position as the parts are viewed in Figure 10 will provide a maximum margin. Conversely, a setting of the device 208 at its extreme clockwise direction as the parts are viewed in Figure 10 will provide a minimum margin. It should be noted that the retracted position of the margin bar 197 is the same regardless of the setting of the device 208. Expressed in other language, the range of movement of said margin bar from operative to inoperative position is varied according to the setting of the device 208, the range of movement being greatest when marginless work is being done and being least when the maximum margin is being used.

An important commercial advantage lying in the adjustable features of the automatic margin bar in combination with the adjustable paper guide hereinbefore described is the following. It is frequently desirable in practice to make from the same master impression upon the gelatin band hectographic copies having a relatively wide margin and other hectographic copies having little or no margin. The range of margin obtainable with the automatic margin bar 197 is of course limited. This range may be increased by using the standard margin bar 95. If a still greater range of margin is desired, having readily obtainable variations in said margin, an adjustable standard margin bar such as the margin bar 95A, illustrated in Figures 6A and 6B, may be used.

The manner in which the standard margin bar 95 or the equivalent thereof may be used alternatively with the automatic margin bar 197 will now be described. In case it is preferred to use the standard margin bar 95, the device 208 of Figure 10 will be moved to its extreme counter-clockwise position, that is—the maximum setting toward the left as the parts are viewed in Figure 10. The paper guide 142 (Fig. 6) will then be tilted at a steep angle. Under these conditions a sheet of paper upon the paper guide 142 will gravitate to a position below the edge of the automatic margin bar 197 into the angle of the standard margin bar 95, whereby a greater margin will be had than is provided for in said automatic margin bar 197. When it is desired to again use the automatic margin bar, the paper guide 142 may be withdrawn from its extreme tilted position and the automatic margin bar adjusted to provide the margin desired.

The present invention contemplates an interconnection between the adjustable automatic margin bar 197 and the tilting paper guide 142 (see Figs. 12A and 12B). For the purpose of providing this interconnection the setting device 208 has pivotally connected thereto the link 230, the other extremity of which link is pivotally connected to the crank 231, which crank is rigidly connected with the eccentric 232. Said eccentric 232 is rotatably mounted upon the shaft 200. Rotatably carried by the eccentric 232 is the link 233, which has a forked extremity 234, which forked extremity provides a downwardly presented mouth 235 for receiving a pin 236 secured to the adjacent flange 146 of the tilting paper guide 142. The jaws of said mouth 235 may be resilient and may present an opening of less width than the diameter of the pin 236, so that the link 233 will not be accidentally disconnected.

It will be clear without detailed explanation that when the automatic margin bar setting device 208 is moved in a counter-clockwise direction to increase the margin provided by the automatic margin bar 197, a clockwise rotation of the eccentric 232 will result, thereby moving the tilting paper guide 142 in a clockwise direction, that is—to a position more nearly horizontal. It is understood, of course, that at this time the setscrews 145 will be loosened so that the tilting of the paper guide 142 will not be interfered with. Conversely, a movement of the setting device 208 in a clockwise direction to decrease the margin provided by the automatic margin bar 197 will move the tilting paper guide 142 to a more inclined position. By reason of this interconnection between the setting device 208 and the tilting paper guide 142 the result is had that regardless of the setting of the automatic margin bar 197 for the reception of paper, the paper guide 142 will be tilted in substantially the proper direction to direct the sheet of paper into the angle of the margin bar 197.

When it is desired to set the automatic margin bar 197 for the maximum setting toward the left as the parts are viewed in Figure 12, and at the same time to tilt the margin bar 142 at a sufficiently steep angle so that paper thereon will gravitate to a position below the edge of the automatic margin bar 197 into the angle of the standard margin bar 95 or the margin bar 95A, the link 233 will be lifted clear of the pin 236, whereby the proper tilted position of the paper guide 142 may be secured while the automatic margin bar 197 is in its extreme retreated position. The setscrews 145—145 will then be tightened up and the automatic margin bar 95 or 95A may then be used, no interference being provided by the automatic margin bar 197. As indicated above, by use of the adjustable features of the automatic margin bar 197 in combination with the standard margin bar 95 or 95A, a complete range of margins may be had upon different sheets of paper applied to the same hectographic impression upon the gelatin band. The advantage of the standard margin bar 95A is that the range of margins which is readily obtainable is greatly increased over that possible with the standard margin bar 95.

The present invention contemplates a construction in which the platen roller 99 may be automatically released from its latched position in proximity to the gelatin band when the carriage 43 approaches the end of its stroke toward the rear of the machine. This construction is valuable in many classes of work in which it is necessary to roll a sheet of paper out flat upon the gelatin band clear of engagement with the gripping roller 100. Under these conditions, as is well understood, the carriage in its return stroke toward the home position will not strip the sheet of paper from the gelatin band. It is common practice to strip such a sheet of paper from the gelatin band by hand before the carriage is returned to its home position. Under these conditions it is desirable that the platen roller be held out of contact with the gelatin band to avoid the smearing of the impression upon said gelatin band by said platen roller. The present invention contemplates a simple structure for automatically releasing the platen roller under these conditions.

Referring now to Figures 1, 2 and 12B, it will be noted that the rod 42 is provided with an adjustable rear stop 237, which adjustable rear stop is provided with the finger grip 238, which may be operated to permit the adjustment of the stop 237 longitudinally of the rod 42. The clamping features of the rear stop 237 need not be described herein, many clamping devices suitable for the purpose being available in the market. Preferably the stop 237 should be provided with a cushioning means 239 adapted to cooperate with the rearward end of the housing 48 whereby to cushion the blow of the housing 48 against the stop 237. Said stop 237 is provided with the upstanding arm 240, which has the forwardly extending portion 241 provided with the forward beveled surface 242. Said arm 240 provides a recess rearwardly of the beveled surface 242 for a purpose which will appear presently.

Mounted upon the housing 48 is the lever 243 pivoted intermediate of its length. It will be found convenient to use the pin 145 as a pivotal mounting means for the lever 243. At one end of said lever 243 is a roller 244 adapted to engage the under side of the beveled surface 242 of the arm 240. The other extremity of the lever 243 is provided with the roller 245 adapted to engage the finger release 196 illustrated in Figures 1, 7, 12B and 15. The finger release 196 is provided with a cam-shaped portion 246 adapted to be engaged by the roller 245 as the lever is swung about the axis of the pin 145. As explained hereinbefore, the finger release 196 is connected with the latch 181, which has the function of engaging the abutment 185 of the toothed sector 129 and thereby latching the platen roller 99 in its position in proximity with the gelatin band. As explained above, the finger release 196 and the latch 181 are biased by the spring 183 into latching relationship relative to the toothed sector 129. As the carriage is moved toward the rear of the machine, the latch 181 will be operative to hold the toothed sector 129 downwardly, thereby holding the platen roller 99 in proximity with the gelatin band. The lever 243 is urged in a counter-clockwise direction by the spring 247, movement in said direction being limited by the abutment 248. It will be understood, of course, that the length of stroke of the carriage will be predetermined by the setting of the adjustable rear stop 237. The parts will be so arranged that before the rear extremity of the housing 48 engages with the buffer 239 of the adjustable rear stop 237, the roller 244 of the lever 243 will engage the inclined surface 242 of the arm 240, which arm is carried by the adjustable stop 237. The engagement between the roller 244 and the slanting surface 242 will result in a clockwise movement of the lever 243, whereby the roller 245 will cause the finger release 196 to move in a counter-clockwise direction, causing the latch 181 to move to unlatching position. The stop 237 will be so adjusted that the roller 244 will be operated when the sheet of paper has been rolled out completely upon the gelatin band, thereby unlatching the platen roller yoke. When the platen roller yoke has been unlatched, the operator will instinctively permit the spring 189 (Fig. 15) to raise the platen roller yoke. The operator will move the carriage a short distance further toward the rear until said carriage is stopped by the rear stop 237. In this position the body of the carriage will present no interference with the stripping of the paper from the gelatin band. After the piece of paper has been stripped from the gelatin band, the operator will return the carriage to its home position. The lever 243 will be returned to the limit of its movement in a counter-clockwise direction by the spring 247 as soon as the roller 244 clears the slanting surface 242, the counter-clockwise swing of said lever being limited by the stop 248. The finger release 196 and the latch 181 will be moved by the spring 183 (Fig. 5) into latching position ready to engage the abutment 185 of the toothed sector 129 when the handle 141 is again depressed.

In Figures 20, 21, 22 and 23 there is illustrated a modification embodying means which may be readily adjusted to provide stops for using selected portions of the exposed surface of the gelatin band. In the modification disclosed in Figures 20 to 23 inclusive the rod 42 is replaced by the rod 280, which is fixed with reference to its length and is carried by the brackets 40 and 41. According to the construction which is at present preferred, said rod 280 is rotatable at least through a portion of a revolution, for reasons which will be explained presently. Said rod on one side thereof is provided with a plurality of spaced notches 281—281. Other portions of the rod 280 are provided with the notches 282—282 having the abrupt walls 283—283 and the sloping walls 284—284. Said notches 281 define the location of the front stop 153 with its plate 170. The abrupt walls 283 define the limits of travel of the housing 48 in a rearward direction, that is—in a direction toward the right as the parts are viewed in Figure 20. The distance between the notches 281—281 will preferably be equal to the distances between the abrupt shoulders 283—283 with which they cooperate. The length of stroke of the housing 48 and consequently of the carriage 43 will be slightly less than the distance between the abrupt shoulders 283—283, or, in other words, will be slightly less than the distance between adjacent notches 281—281. In practice this distance between the notches 281—281 may be chosen as four inches. The length of stroke of the carriage may be approximately three and three-fourths inches. Inasmuch as the front stop 153 may in the embodiment of the invention disclosed in Figures 20 to 23 be located at any one of a plurality of positions along the length of the machine, the marginless margin bar 197 will ordinarily be used. By reason of the fact that the impression roller 99 cooperates with a pliable surface of the gelatin band, a length of stroke of the carriage of approximately three and three-fourths inches will make an impression of approximately four inches upon the paper located upon the gelatin band. According to this example, each notch 281 is in fixed relationship with a notch 282 lengthwise of the machine in such a manner that the row of notches 282—282 in cooperation with detent 286 will limit each stroke of the carriage to approximately three and three-fourths inches, while the notches 281—281, which establish the plurality of home positions, will be spaced at distances of four inches.

The front stop 158 is provided with a spring-pressed detent 285 (whereby said front stop, in the construction illustrated in Figures 20, 21, 22 and 23, may be shiftable), and the housing 48 at its extremity spaced from the front stop 158 is provided with a spring-pressed detent 286. In order that the front stop 158 may be non-rotatably though shiftably held, said stop 158 may be provided with a pair of spaced abutments 286A disposed on the two sides of the flange 37 (Figs. 4 and 21). The detent 285 is adapted to cooperate with the various notches 281—281. The detent 286 is adapted to cooperate with the various notches 282—282. The spring-pressed detents 285 and 286 may be substantially similar in their construction and a description of one will suffice for a description of both. It will be noted that the detent 285 comprises a plunger 287 having a head 288, which head has a reduced portion 289 adapted to seat itself within any one of the notches 281. As will be noted from an inspection of Figure 21, the notches 281 and 282 are in the form of segments, whereby if the shaft 280 is turned through part of a revolution the plungers 287 will be thrust outwardly whereby to be clear thereof. The plunger 287 is guided within the casing 290, within which is also located the compression spring 291. The end of the plunger 287 is provided with the finger grip 292, whereby the plunger 287 may be manually operated. The finger grip 292 is provided with a guide pin 293 riding within the casing 290 for maintaining the head 289 of the plunger 287 always in a predetermined position in a plane normal to the length of the rod 280. The casing 290 of the detent 285 is integral with the front stop 158, and the casing 290A of the detent 286 is threaded into the housing 48 forming part of the carriage assembly. The detent 286 should be so located relative to the detent 285 when the plate 175 is in contact with the plate 170 that when the reduced portion 289 of the detent 285 is located within a notch 281, the reduced portion 289 of the detent 286 is slightly beyond the notch 282 which is located immediately in advance of the notch 282 which is to define the limit of rearward movement of the detent 286. Expressed in other language, it may be stated that the detents 285 and 286 are intended to mark the limits of movement of the housing 48 and consequently of the carriage assembly 43 of which said housing 48 forms a part. The forward position of the housing 48, that is—the left-hand position as the parts are viewed in Figure 20, is limited by the detent 285, which locates the front stop 158. The rearward limit of movement of the housing 48 and consequently of the carriage assembly 43 is defined by the notch 282 in rear of the detent 286, that is—to the right as the parts are viewed in Figure 20. In other words, the housing 48 is capable of a range of movement slightly less than the distances between the abrupt shoulders 283—283 of successive notches 282—282.

As indicated above, the rod 280 should be rotatable in the brackets 40 and 41 throughout at least a portion of a revolution. At the forward end of the rod 280 there is indicated a detent mechanism comprising a finger grip 294 having a locating recess 295 on the rear face thereof. Said recess 295 is adapted to receive a spring-pressed detent 296. Said detent 296 should be so located relative to the recess 295 that it locates the rod 280 in the proper circumferential position of said rod 280 to cooperate with the reduced portions 289 of the detents 285—286. By turning the shaft 280 through a portion of a revolution the detents 285 and 286 will be thrust outwardly relative to the axis of the rod 280, whereby said detents will ride upon cylindrical portions of said rod 280. Under these conditions the front stop 158 may be pushed toward the rear of the machine, moving with it the housing 48 and the carriage 43. Said front stop 158 will be moved to a position slightly in rear of its desired adjusted position, after which the rod 280 will be returned to its circumferential position in which the detent 296 seats itself within the recess 295. The housing 48 may then be drawn forwardly through a short distance. The reduced portion of detent 285 will snap into the adjacent notch 281 and the reduced portion of the detent 286 will still ride upon a cylindrical portion of the rod 280.

A decided commercial advantage results from the construction illustrated in Figures 20 to 23 inclusive, in that it is a simple matter to take off different portions of a master impression, as for example when different portions of a master impression are to go to different departments of a business house. It is also simple to impress a plurality of relatively short master copies upon the gelatin band and to thereafter make hectographic copies comprising all or any desired portions of the impression from said plurality of master copies. This also has its advantages in many business organizations.

Referring now to Figure 24, a simplified construction is illustrated in which the carriage lock is eliminated. The construction illustrated in Figure 4 will appeal to those who desire a cheaper construction than that illustrated in the preceding figures. By reference to Figure 24 it will be noted that the plate 175 has been omitted from the forward extremity of the sleeve 70. The plate 170 has also been omitted from the front stop 158. Instead the front stop 158 has been provided with a conical buffer 297, which may be of rubber or equivalent material. Said conical buffer 297 may cooperate with a conical surface 298 at the forward end of the housing 48. The construction illustrated in Figure 24 omits the pin 191 with its associated parts, including the spring 194, the finger release 190, the pin 188, the spring 189, the sleeve 189A, the lock nut 190A and the head 190B.

Though certain preferred embodiments of the present invention have been described in detail, many modifications will occur to those skilled in the art. It is intended to cover all such modifications that fall within the scope of the appended claims.

What is claimed is—

1. In a copying machine, in combination, a bed, a carriage movable along said bed, a platen roller in said carriage, a pressure roller engageable with said platen roller to strip paper from said bed, a guide rod arranged along one side of said bed upon which said carriage is swung, and a pair of racks fixed relative to said bed, a pair of pinions connected together and adapted to mesh with said racks, said pinions being mounted on said carriage, and gearing connecting said pinions to one of said rollers.

2. In a copying machine, in combination, a bed, a carriage movable along said bed, a guide rod arranged along one side of said bed upon which said carriage is swung, and a pair of racks fixed relative to said bed, said carriage being provided with a pair of pinions connected together and adapted to mesh with said racks, one of said racks and its cooperating pinion being provided with piloting means for piloting said pinions into meshing relationship with said racks.

3. In a copying machine, in combination, a bed, a carriage movable along said bed, a platen roller in said carriage, a pressure roller engageable with said platen roller to strip paper from said bed, a guide rod extending along said bed upon which said carriage is swingingly mounted, a track extending along the other side of said bed, the swinging extremity of said carriage having abutment means adapted to ride upon said track, a pair of racks on said bed, a pair of pinions carried by said carriage and adapted to mesh with said racks, said pinions being rigidly connected together, and gearing connecting said pinions with one of said rollers.

4. In a copying machine, in combination, a bed, a carriage movable along said bed, a guide rod extending along said bed upon which said carriage is swingingly mounted, a track extending along the other side of said bed, the swinging extremity of said carriage having abutment means adapted to ride upon said track, said bed being provided with a pair of racks and said carriage being provided with a pair of pinions adapted to mesh with said racks, said pinions being rigidly connected together, said abutment means being adjustable relative to said carriage, and means including adjustable members diametrically disposed relative to said rod for adjusting the position of said carriage relative to said rod whereby said carriage may be adjusted relative to said bed and whereby said pinions may be adjusted relative to said racks.

5. In a copying machine, in combination, a bed, a carriage movable along said bed, a rod for swingingly supporting one end of said carriage, a track for slidingly supporting the other end of said carriage, said carriage being provided with adjustable means including adjustable members diametrically disposed relative to said rod and bushings engaging said rod whereby said carriage may be adjusted in a direction normal to said bed, the swinging end of said carriage being provided with adjustable means abutting said track whereby the swinging end of said carriage may be adjusted relative to said bed.

6. In a copying machine, in combination, a bed, a carriage movable along said bed, a rod for swingingly supporting one end of said carriage, a track for slidingly supporting the other end of said carriage, said carriage being provided with adjustable means including adjustable members diametrically disposed relative to said rod and bushings engaging said rod whereby said carriage may be adjusted in a direction normal to said bed, the swinging end of said carriage being provided with adjustable means abutting said track whereby the swinging end of said carriage may be adjusted relative to said bed, said bed being provided with a pair of parallel racks, said carriage being provided with a pair of pinions connected together and adapted to mesh with said racks.

7. In a copying machine, in combination, a bed, a carriage movable along said bed, a rod for swingingly supporting one end of said carriage, and a track for slidingly supporting the other end of said carriage, said carriage being provided with adjustable bushings engaging said rod whereby said carriage may be adjusted in a direction normal to said bed, the swinging end of said carriage being provided with adjustable means abutting said track whereby the swinging end of said carriage may be adjusted relative to said bed, said bed being provided with a pair of parallel racks, said carriage being provided with a pair of pinions connected together and adapted to mesh with said racks, one of said pinions being provided with piloting means for piloting said pinions into meshing relationship with said racks as said carriage is swung into operative position in proximity with said bed.

8. In a copying machine, in combination, a bed, a carriage movable along said bed, a rod extending along said bed lengthwise thereof for swingingly supporting one end of said carriage, a track along the other side of said bed for slidingly supporting the other end of said carriage, and trip means cooperatively associated with said track and with the swinging extremity of said carriage for latching the swinging extremity of said carriage into position adjacent to said track and preventing rebound of said carriage.

9. In a copying machine, in combination, a bed, a carriage movable along said bed, a rod extending along said bed lengthwise thereof for swingingly supporting one end of said carriage, a track along the other side of said bed for slidingly supporting the other end of said carriage, trip means cooperatively associated with said track and with the swinging extremity of said carriage for latching the swinging extremity of said carriage into position adjacent to said track and preventing rebound of said carriage, and means for adjusting said trip means in a direction tangential to the circle defining the swinging movement thereof.

10. In a copying machine, in combination, a bed, a carriage movable along said bed, a rod extending along said bed lengthwise thereof for swingingly supporting one end of said carriage, a track along the other side of said bed for slidingly supporting the other end of said carriage, and trip means cooperatively associated with said track and with the swinging extremity of said carriage for latching the swinging extremity of said carriage into position adjacent to said track and preventing rebound of said carriage, said track being reduced in width adjacent to the forward position of said carriage, said trip means being incapable of clearing said track except at said reduced portion.

11. In a copying machine, in combination, a bed, a carriage movable along said bed, a rod extending along one side of said bed for swingingly supporting one end of said carriage, a front stop carried by said rod, means carried by said carriage adapted to abut said front stop, and means for adjusting said rod longitudinally of said bed for adjusting the position of said front stop.

12. In a copying machine, in combination, a bed, a carriage movable along said bed, a rod extending along said bed for swingingly supporting one end of said carriage, a front stop carried by said rod, a spring-pressed locking member carried by said carriage, said locking member being rotatable about the axis of said rod, cam means for rotating said locking member, said locking member being adapted to clear said front stop at one of its rotative positions and to engage said front stop in another of its rotative positions.

13. In combination, a movable carriage, a front stop for limiting forward movement of said carriage, a locking member rotatable about an axis parallel with the direction of movement of said carriage, spring means for urging said rotatable member forwardly, said rotatable member and said carriage having interacting cam means for rotating said rotatable means when said rotatable means abuts against said front stop, said rotatable means and said front stop having latching portions adapted to clear in one rotated position of said rotatable member and to latch in another position of said rotatable member.

14. In combination, a movable carriage, a front stop for limiting forward movement of said carriage, a locking member rotatable about an axis parallel with the direction of movement of said carriage, spring means for urging said rotatable member forwardly, said rotatable member and said carriage having interacting cam means for rotating said rotatable means when said rotatable means abuts against said front stop, said rotatable means and said front stop having latching portions adapted to clear in one rotated position of said rotatable member and to latch in another position of said rotatable member, and locking means adapted to prevent longitudinal movement of said rotatable member.

15. In a copying machine, in combination, a bed, a carriage movable along said bed, a guide rod for said carriage, a sleeve encircling said guide rod, a spring cooperating between said sleeve and said carriage for thrusting said sleeve forwardly relative to said carriage, a stop plate upon said guide rod, said sleeve and said stop plate having cooperating latching portions, said latching portions being adapted to clear in one rotative position of rotation of said sleeve and to latch in another rotative position of said sleeve relative to said stop plate, said sleeve being adapted to abut said stop plate and to be moved rearwardly against the compression of said spring, cam means for turning said sleeve during the longitudinal movement thereof, and releasable trip means for holding said sleeve relative to said carriage in opposition to said spring.

16. In a copying machine, in combination, a bed, a carriage movable along said bed, a stop plate fixed relative to said bed, a carriage lock carried by said carriage, said carriage lock comprising a rotatable member, a spring for urging said rotatable member longitudinally of said bed, cam means carried by said carriage for communicating a turning movement to said rotatable member, said rotatable member having a portion adapted to abut said stop member whereby to move said rotatable member longitudinally in opposition to said spring, said stop member and said sleeve having cooperating latching members adapted to clear in one rotative position of said rotatable member and to latch in another rotative position of said rotatable member, and means for latching said sleeve relative to said carriage.

17. In combination, in a copying machine, a bed, a carriage movable along said bed, a platen roller carried by said carriage, a platen roller yoke for supporting said platen roller, a front stop for said carriage, a sleeve carried by said carriage and adapted to move relative to said carriage in the direction of movement of said carriage, a spring for urging said sleeve forwardly, cam means for rotating said sleeve in its longitudinal movement relative to said carriage, said sleeve being provided with means forming a positive abutment with said front stop, said sleeve and said front stop being provided with interacting carriage locking means, said carriage being provided with latching means adapted to latch said sleeve in retracted position, and means responsive to movement of said platen roller yoke for releasing said latching means.

18. In a copying machine, in combination, a bed, a carriage movable along said bed, a front stop, a rotatable member carried by said carriage and movable relative to said carriage in a direction parallel with the direction of movement of said carriage along said bed, a spring for urging said rotatable member forward, means for turning said rotatable member when said sleeve engages said front stop, said sleeve and said front stop having cooperating locking portions whose operativeness is dependent upon the rotative position of said rotatable member, and spring-pressed means for latching said rotatable member in one of its longitudinal positions, said carriage being provided with a platen roller yoke and means responsive to operation of said platen roller yoke for releasing said latching means.

19. In a copying machine, in combination, a bed, a slide rod extending along said bed, a carriage guided by said slide rod and movable along said bed, a platen roller yoke carried by said carriage, latch means carried by said carriage for holding said yoke in depressed position, means for locking said carriage in a predetermined position relative to the stroke of said carriage, said means including a spring-pressed latch carried by said carriage and rotatable around the longitudinal axis of said slide rod, and means responsive to movement of said platen roller yoke for removing said spring-pressed latch from latching position.

20. In a copying machine, in combination, a bed, a carriage movable along said bed, a platen roller yoke carried by said carriage, latch means carried by said carriage for holding said yoke in depressed position, means for locking said carriage in a predetermined position relative to the stroke of said carriage, said means including a spring-pressed latch carried by said carriage, and means responsive to movement of said platen roller yoke for removing said spring-pressed latch from latching position, said removing means including an adjustable abutment cooperating with said yoke whereby the instant of unlatching of said carriage locking means may be accurately predetermined relative to the movement of said yoke.

21. In a copying machine, in combination, a platen roller yoke comprising a pair of arms, a platen roller, said platen roller having cylindrical extremities located in aligned holes in said arms, said holes being of greater diameter than said extremities, a pair of adjusting screws disposed in each of said arms spaced about the axis of said holes for positioning said extremities, and a spring-pressed member disposed approximately symmetrical with said adjusting screws for providing a third point of contact for floatingly supporting each of said extremities.

22. In a copying machine, in combination, a platen roller yoke comprising a pair of arms, a platen roller, said platen roller having cylindrical extremities located in aligned holes in said arms, said holes being of greater diameter than said extremities, a pair of adjusting screws disposed in each of said arms spaced about the axis of said holes for positioning said extremities, a spring-pressed member disposed approximately symmetrical with said adjusting screws for providing a third point of contact for floatingly supporting each of said extremities, and a pressure roller cooperating with said platen roller, the components of the force applied by said spring-pressed member being directed through the lines of contacts with the respective adjusting members substantially normal to said bed and substantially through the axis of said pressure roller when said platen roller is in its operative position.

23. In a copying machine, in combination, a bed, a carriage movable along said bed, means for supporting said carriage including a round rod extending along said bed, a split bushing encircling said rod, and adjusting screws abutting said bushing, said screws being spaced circumferentially around the axis of said rod.

24. In a copying machine, in combination, a bed, a carriage movable along said bed, means for supporting said carriage including a round rod extending along said bed, a split bushing encircling said rod, and adjusting screws abutting said bushing, said screws being spaced circumferentially around the axis of said rod, each of said adjusting screws being provided in its outer extremity with a plurality of diametrical slots and circular means riding in said slots to hold said adjusting screws in adjusted position.

25. In a copying machine, in combination, a bed, a carriage movable along said bed, a rod extending along one side of said bed for swingingly mounting one end of said carriage, a pair of racks extending along said bed, a pair of pinions carried by said carriage and adapted to mesh with said racks, a shaft connecting said pinions, and adjusting screw means for rotatably adjusting one of said pinions relative to said shaft.

26. In a copying machine, in combination, a bed, a carriage movable along said bed, a rod extending along one side of said bed for swingingly supporting one end of said carriage, a pair of racks carried by said bed, a pair of pinions carried by said carriage, a shaft connecting said pinions, one end of said shaft including a flat member disposed diametrically thereof, one of said pinions being provided with a pair of adjusting screws adapted to abut said flat member to hold this pinion in adjusted rotative relationship with said flat member.

27. In a copying machine, in combination, a bed, a carriage movable along said bed, a rod extending along one side of said bed for swingingly supporting one end of said carriage, a track disposed along the other side of said bed for supporting the other end of said carriage, a pair of racks extending along said bed, a pair of pinions carried by said carriage, means for holding said pinions in rigid relationship with each other, and adjusting means for insuring the proper meshing relationship between said pinions and said racks comprising screw-threaded means for taking the thrust between said carriage and said track, an adjusting bushing encircling said rod, and screw-threaded means cooperating with said carriage for holding said bushing in adjusted relationship with said carriage, said insuring means also including adjustment means for one of said pinions relative to the other of said pinions.

28. In a copy machine, in combination, a bed, a carriage movable along said bed, a rod extending along one end of said bed for swingingly supporting one end of said carriage, a split bushing encircling said rod, and adjusting screws carried by said carriage for holding said bushing in adjusted relationship with said carriage, said screws being diametrically disposed with respect to said rod.

29. In a copying machine, in combination, a bed, a carriage movable along said bed, a rod extending along one end of said bed for swingingly supporting one end of said carriage, a split bushing encircling said rod, and adjusting screws carried by said carriage for holding said bushing in adjusted relationship with said carriage, said screws including a pair of screws tightly holding said bushing against movement normal to said bed, said pair of screws being diametrically disposed with respect to said rod and screw means limiting movement of said bushing in a direction transversely of said bed.

30. In a copying machine, in combination, a bed, a carriage movable along said bed, means for supporting said carriage at the two sides of said bed, a platen roller yoke journaled in said carriage, a floating platen roller in said yoke, spring means for urging said platen roller into operative relationship with said bed when said yoke is in depressed position, means for locking said yoke in depressed position, and adjustable means for limiting movement of said yoke toward said bed.

31. In a copying machine, in combination, a bed, a carriage movable along said bed, means for supporting said carriage at the two extremities thereof and for preventing rebound of said carriage in operation, a platen roller yoke pivoted to said carriage, and a platen roller journaled in said yoke, said platen roller being resiliently supported at each of its extremities within said yoke and being capable of movement in a direction normal to said bed when said yoke is in depressed position and being also capable of movement in a direction substantially parallel with said bed when said yoke is in depressed position.

32. In a copying machine, in combination, a bed, a carriage movable along said bed, means for supporting said carriage at its two ends at the sides of said bed and for preventing rebound of said carriage, a platen roller yoke pivoted to said carriage, a platen roller loosely journaled at its two extremities in said yoke, said extremities being capable of movement relative to said yoke in all directions normal to the axis of swing of said yoke, adjustable stop means for the two extremities of said platen roller for limiting movement of said extremities in two directions, and spring means for exerting a force approximately symmetrical with said stop means for holding said extremities against said stop means.

33. In a copying machine, in combination, a bed, a carriage, said carriage including a pressure roller and a swinging yoke including a platen roller, and positive driving means permanently connected between said yoke and said pressure roller.

34. In a copying machine, in combination, a bed, rack means disposed along said bed, a carriage, said carriage including pinion means adapted to mesh with said rack means, a pressure roller and a swinging platen roller yoke, means providing a positive driving connection between said yoke and said pressure roller, and means providing a permanent positive driving connection between said pinion means and said pressure roller.

35. In a copying machine, in combination, a bed, rack means disposed along said bed, a carriage, said carriage including a pinion adapted to mesh with said rack means and also including a pressure roller, a platen roller yoke, and positive driving means between said yoke and said pressure roller and between said pinion and said pressure roller, said driving connections including a planetary gear revoluble about the axis of said pinion and a second planetary gear meshing with said first planetary gear, said second planetary gear being revoluble about the axis of said pressure roller.

36. In a copying machine, in combination, a bed, rack means disposed along said bed, a carriage movable along said bed, said carriage including a pivoted platen roller yoke having a platen roller journaled therein, said carriage also including a pressure roller adapted to cooperate with said platen roller, pinion means adapted to mesh with said rack means, positive driving connections between said elements, said driving means including toothed means rigid with said yoke, bell crank means adapted to be driven by said first-mentioned toothed means, said bell crank means being provided with a planetary gear having driving relationship with said pressure roller and revoluble about the axis of said pressure roller, a strap linked with said pinion means, and another planetary gear rotatably carried by said strap and having a planetary motion about the axis of said pinion means, said bell crank means and said strap being linked together, said gears having meshing relationship with each other.

37. In a copying machine, in combination, a bed, rack means disposed along said bed, a carriage, said carriage including a pinion meshing with said rack means, a platen roller yoke, a platen roller disposed in said yoke, a pressure roller, and driving means between said platen roller yoke and said pressure roller including planetary gears linked together, one of said planetary gears being revoluble about the axis of said pinion means, the other of said planetary gears being revoluble about the axis of said pressure roller for communicating a slight turning movement to said pressure roller while said platen roller yoke is being depressed whereby to compensate for the tendency of said platen roller to turn when said platen roller is in operative position relative to said pressure roller.

38. In a copying machine, in combination, a bed, a standard margin bar across said bed, a carriage movable along said bed, a platen roller yoke carried by said carriage, a paper guide carried by said carriage, an automatic margin bar carried by said carriage, and means connected with said automatic margin bar for swinging said margin bar into and out of operative position in response to movement of said platen roller yoke, said paper guide being tiltable, said automatic margin bar being movable out of operative relationship with said paper guide whereby said paper guide in one of its tilted positions may direct paper directly to said standard margin bar without interference from said automatic margin bar.

39. In a copying machine, in combination, a bed, a carriage movable along said bed, said carriage including a tiltable paper guide, a platen roller yoke and an automatic margin bar, means connecting said platen roller yoke with said automatic margin bar whereby said automatic margin bar is moved in response to movement of said platen roller yoke between a retracted position and an unretracted position, adjusting means for said automatic margin bar for adjusting the unretracted position of said automatic margin bar, and connecting means between said adjusting means and said tiltable paper guide whereby said paper guide will be tilted in response to movement of said adjusting means.

40. In a copying machine, in combination, a bed, a carriage movable along said bed, said carriage including a tiltable paper guide, a platen roller yoke and an automatic margin bar, means connecting said platen roller yoke with said automatic margin bar whereby said automatic margin bar is moved in response to movement of said platen roller yoke between a retracted position and an unretracted position, adjusting means for said automatic margin bar for adjusting the unretracted position of said automatic margin bar, and connecting means between said adjusting means and said tiltable paper guide whereby said paper guide will be tilted in response to movement of said adjusting means, said connecting means being readily disconnectable.

41. In a hectograph machine, in combination, a bed, a carriage movable along said bed a standard margin bar, the paper receiving angle of which is adjustable longitudinally of said machine, a carriage, a platen roller yoke pivoted to said carriage, an automatic margin bar swingingly carried by said carriage, a tiltable paper guide carried by said carriage, and means operatively connected with said automatic margin bar for adjusting the paper receiving position of said automatic margin bar.

42. In a hectograph machine, in combination, a bed, a carriage movable along said bed, a standard margin bar, the paper receiving angle of which is adjustable longitudinally of said machine, a carriage, a platen roller yoke pivoted to said carriage, an automatic margin bar swingingly carried by said carriage, a tiltable paper guide carried by said carriage, means operatively connected with said automatic margin bar for adjusting the paper receiving position of said automatic margin bar, and connecting means between said adjustment means and said tiltable paper guide for preserving a predetermined relationship between the paper receiving position of said automatic margin bar and said paper guide.

43. In a hectograph machine, in combination, a bed, a carriage movable along said bed, a standard margin bar, the paper receiving angle of which is adjustable longitudinally of said machine, a carriage, a platen roller yoke pivoted to said carriage, an automatic margin bar swingingly carried by said carriage, a tiltable paper guide carried by said carriage, means operatively connected with said automatic margin bar for adjusting the paper receiving position of said automatic margin bar, and connecting means between said adjustment means and said tiltable paper guide for preserving a predetermined relationship between the paper receiving position of said automatic margin bar and said paper guide, said connecting means being readily disconnectable whereby said automatic margin bar may be adjusted independently of said paper guide and whereby paper from said paper guide may be directed toward said standard margin bar independently of said automatic margin bar.

44. In a copying machine, in combination, a bed, a standard margin bar located across said bed, a carriage movable along said bed, a platen roller yoke, an automatic margin bar carried by said carriage and operable in response to movement of said yoke, and a paper guide carried by said carriage, said automatic margin bar being capable of movement out of range of the paper in said paper guide, said paper guide being tiltable whereby to cooperate with either said automatic margin bar or said standard margin bar.

45. In a copying machine, in combination, a bed, a carriage movable along said bed, an automatic margin bar carried by said carriage, a platen roller yoke carried by said carriage, connecting means between said automatic margin bar and said yoke, and means for adjusting said connecting means whereby the paper receiving position of said automatic margin bar may be adjusted, said adjusting means comprising a manually operable member adapted to be latched selectably in any one of a plurality of positions.

46. In a copying machine, in combination, a bed, a carriage movable along said bed, a slide rod disposed along one side of said bed, a bushing encircling said slide rod, adjusting means carried by said carriage for adjusting the position of said carriage relative to said bushing in a direction normal to said bed when said carriage is in operative position, and adjustable means carried by said carriage for maintaining said carriage in proper alignment transversely of said bed.

47. In a copying machine, in combination, a bed, a carriage movable along said bed, a platen roller yoke carried by said carriage, said platen roller yoke having a platen roller journaled therein, latching means for holding said platen roller yoke in operative position relative to said bed, and means for tripping said latching means, said means comprising an adjustable rear stop adapted to be disposed at selected regions along the length of said bed.

48. In a copying machine, in combination, a bed, a carriage movable along said bed, a rear stop for said carriage, said rear stop being adjustable along the length of said bed, a platen roller yoke swingingly carried by said carriage, latching means for said platen roller yoke, and means cooperatively associated with said rear stop for tripping said latching means when said carriage is in proximity to said rear stop.

49. In a copying machine, in combination, a bed, a carriage movable along said bed, a rear stop for said carriage, said rear stop being adjustable along the length of said bed, a platen roller yoke swingingly carried by said carriage, latching means for said platen roller yoke, and means cooperatively associated with said rear stop for tripping said latching means when said carriage is in proximity to but slightly in advance of said rear stop.

50. In a copying machine, in combination, a bed, a carriage movable along said bed, a rear stop for said carriage, a platen roller yoke swingingly carried by said carriage, means for latching said platen roller yoke in operative position relative to said bed, means responsive to movement of said platen roller yoke for tripping said latching means, and means carried by said rear stop for tripping said latching means.

51. In a copying machine, in combination, a bed, a carriage movable along said bed, a rear stop for said carriage, a platen roller yoke swingingly carried by said carriage, means for latching said platen roller yoke in operative position relative to said bed, means responsive to movement of said platen roller yoke for tripping said latching means, and means carried by said rear stop for tripping said latching means, said trip means carried by said rear stop being so positioned as to trip said latching means when said carriage is in a position a short distance forward of said rear stop.

52. In a copying machine, in combination, a bed, a carriage movable along said bed, a platen roller yoke carried by said bed, latching means for said platen roller yoke for holding said platen roller yoke in depressed position, means carried by said carriage for releasing said platen roller yoke when said carriage is in home position relative to said bed, and trip means for said latching means located rearwardly of the home position of said carriage, said trip means being adjustable along the length of said bed.

53. In a copying machine, in combination, a bed, a carriage movable along said bed, a platen roller yoke carried by said carriage, latch means for holding said platen roller yoke in operative position, means carried by said carriage for releasing said latch means when said carriage is in home position, a tripping device carried by said carriage and adapted to release said latch member, and a trip member adjustable along the length of said bed for engagement with said tripping device when said carriage is moved to a predetermined position along said bed away from its home position.

54. In a copying machine, in combination, a bed, a carriage movable along said bed, a platen roller yoke carried by said carriage, latch means for holding said platen roller yoke in operative position, means carried by said carriage for releasing said latch means when said carriage is in home position, a tripping device carried by said carriage and adapted to release said latch member, a trip member adjustable along the length of said bed for engagement with said tripping device when said carriage is moved to a predetermined position along said bed away from its home position, and a rear stop for said carriage adjustable along the length of said bed, the position of said trip means being determined by the position of said rear stop.

55. In a copying machine, in combination, a bed, a carriage movable along said bed, a platen roller yoke carried by said carriage, latch means for holding said platen roller yoke in operative position, means carried by said carriage for releasing said latch means when said carriage is in home position, a tripping device carried by said carriage and adapted to release said latch member, a trip member adjustable along the length of said bed for engagement with said tripping device when said carriage is moved to a predetermined position along said bed away from its home position, and a rear stop for said carriage adjustable along the length of said bed, the position of said trip means being determined by the position of said rear stop, said trip means being operative to control said tripping device at a position of said carriage a short distance in advance of said rear stop.

56. In a copying machine, in combination, a carriage, a platen roller yoke carried by said carriage, an automatic margin bar swingingly carried by said carriage, a lost motion connecting means between said platen roller yoke and said automatic margin bar, said lost motion connecting means including an abutment member movable with said platen roller yoke, a lost motion member adapted to be moved by said abutment means, crank means, and a spring reacting between said crank means and said automatic margin bar and tending to hold said automatic margin bar in paper receiving position, said abutment and said lost motion member being positioned to operate said crank as said platen roller yoke is moved to operative position in a direction to compress said spring and move said automatic margin bar after the lost motion of said lost motion connecting means has been taken up.

57. In a copying machine, in combination, a carriage having a platen roller yoke and an automatic margin bar, abutment means movable with said yoke, a movable member having portions providing a lost motion connection between said abutment and said movable member, spring means for urging said margin bar toward operative position, and means responsive to said movable member for compressing said spring to move said margin bar to inoperative position.

58. In a copying machine, in combination, a bed, a carriage movable along said bed, a rod along said bed about which said carriage is adapted to swing in planes normal to said bed, a front stop for said carriage, and locking means carried by said carriage and cooperating with said front stop, said front stop being provided with a slotted member permitting the swinging of said carriage while said carriage is in locked relationship with said front stop.

59. In a copying machine, in combination, a bed, a carriage movable along said bed, a rod disposed along said bed, said rod being provided with a first set of spaced notches along its length and with a second set of spaced notches along its length, said first set of notches being symmetrical with parallel radii, said second set of notches being symmetrical with a different set of parallel radii, and a shiftable front stop for said carriage having detent means adapted to cooperate with one of said sets of notches, said carriage being provided with detent means adapted to cooperate with the other set of notches, said other set of notches being provided with graduated openings leading thereto from the front of said machine.

60. In a copying machine, in combination, a bed, a carriage movable along said bed, a rod disposed along said bed, said rod being provided with a first set of spaced notches along its length and with a second set of spaced notches along its length, said first set of notches being symmetrical with parallel radii, said second set of notches being symmetrical with a different set of parallel radii, and a shiftable front stop for said carriage having detent means adapted to cooperate with one of said sets of notches, said carriage being provided with detent means adapted to cooperate with the other set of notches, said other set of notches being provided with graduated openings leading thereto from the front of said machine, said second set of notches being so located relative to said front stop that the movement of said carriage is limited to a distance slightly less than the distance between the notches of said second set of notches.

61. In a copying machine, in combination, a bed, a carriage movable along said bed, a rod extending along said bed, said rod being provided with a first set of spaced abutments, and a front stop having detent means adapted to cooperate selectively with said abutments, said rod being provided with a second set of spaced abutments, said carriage being provided with spring-pressed detent means adapted to cooperate selectively with the abutments of said second set.

62. In a copying machine, in combination, a bed, a carriage movable along said bed, a rod extending along said bed, said rod being provided with a first set of spaced abutments, and a front stop having detent means adapted to cooperate selectively with said abutments, said rod being provided with a second set of spaced abutments, said carriage being provided with spring-pressed detent means adapted to cooperate selectively with the abutments of said second set, the abutments of said second set being so located relative to said detent carried by said carriage and with the abutments of said first set of abutments that the range of travel of said carriage is limited to a distance slightly less than the distance between the abutments of said second set of abutments.

63. In a copying machine, in combination, a bed, a carriage movable along said bed, a round rod extending along said bed, said round rod being rotatable, a first set of notches spaced along said rod, a second set of notches being spaced along said rod, the notches of each of said sets being segments of said round rod, and a front stop having a spring-pressed detent adapted to fit into the first set of said notches, said carriage being provided with spring-pressed detent means adapted to fit into the second set of said notches whereby upon rotation of said rod said rod may be free of said detents, whereby said carriage, said front stop and said detents may be moved lengthwise of said rod without interference with said notches.

64. In a copying machine, in combination, a bed, a carriage movable along said bed, a round rod extending along said bed, said round rod being rotatable, a first set of notches spaced along said rod, a second set of notches being spaced along said rod, the notches of each of said sets being segments of said round rod, a front stop having a spring-pressed detent adapted to fit into the first set of said notches, said carriage being provided with spring-pressed detent means adapted to fit into the second set of said notches, whereby upon rotation of said rod said rod may be freed of said detents, whereby said carriage, said front stop and said detents may be moved lengthwise of said rod without interference with said notches, and spring-pressed locking means for said round rod for determining the rotative positions of said round rod.

65. In a copying machine, in combination, a bed, a carriage movable along said bed, a rod extending along said bed lengthwise thereof for swingingly supporting one end of said carriage, a track along the other side of said bed for supporting the other end of said carriage, and releasable means for holding the swinging extremity of said carriage in position adjacent to said track and preventing rebound of said carriage.

66. In a copying machine, in combination, a bed, a carriage movable along said bed, means for locking said carriage at a predetermined region relative to said bed, a platen roller yoke carried by said carriage, and means responsive to the operation of said yoke for latching and unlatching said locking means, said locking means being releasable at a predetermined moment slightly later than the moment at which said platen roller contacts with the paper upon the printing surface upon said bed.

67. In a copying machine, in combination, a bed, a carriage movable along said bed, means for locking said carriage at a predetermined region relative to said bed, a platen roller, means for floatingly supporting said roller from said carriage, and means responsive to movement of said supporting means for unlocking said carriage at an instant after said roller has con- 68. In a copying machine, in combination, a bed, a carriage movable along said bed, means for locking said carriage at a predetermined region relative to said bed, a platen roller, means for floatingly supporting said roller from said carriage, and adjustable means responsive to movement of said supporting means for unlocking said carriage at an instant after said roller has contacted with the paper upon the printing surface upon said bed.

69. In a copying machine, in combination, a bed, a carriage movable along said bed, means for locking said carriage at a predetermined region relative to said bed, a platen roller, means for floatingly supporting said roller from said carriage, and adjustable means responsive to movement of said supporting means for unlocking said carriage at an instant after said roller has contacted with the paper upon the printing surface upon said bed, said last mentioned means being manually operable.

70. In a copying machine, in combination, a bed, a carriage movable along said bed, means for locking said carriage at a predetermined region relative to said bed, a platen roller, means for floatingly supporting said roller from said carriage, and adjustable means responsive to movement of said supporting means for unlocking said carriage at an instant after said roller has contacted with the paper upon the printing surface upon said bed, said last mentioned means being manually operable and being carried by said carriage.

71. In a copying machine, in combination, a bed, a carriage movable along said bed, a platen roller yoke carried by said carriage, a platen roller floatingly carried by said yoke, means responsive to movement of said yoke for locking said carriage in a predetermined region relative to said bed and for releasing said carriage at an instant after said platen roller has contacted with the paper upon said bed, means for latching said yoke in operative position, means operative when said carriage is adjacent to home position for releasing said latching means, and an operating handle carried by said yoke, whereby a simple push on said handle in the running out stroke followed by a simple pull on the return stroke will suffice to complete the full cycle of movement necessary to perform the operation of successively applying a sheet of paper in operative position relative to said bed and stripping said sheet of paper from said operative position.

72. In a copying machine, in combination, a bed, a slide rod extending along one side of said bed, a carriage swingingly and slidably mounted upon said rod, a track for supporting the swinging extremity of said carriage, a platen roller yoke carried by said carriage, a platen roller floatingly carried by said yoke, means responsive to movement of said yoke for locking said carriage in a predetermined region relative to said bed and for releasing said carriage at an instant after said platen roller has contacted with the paper upon said bed, means for latching said yoke in operative position, means operative when said carriage is adjacent to home position for releasing said latching means, and an operating handle carried by said yoke whereby a simple push on said handle in the running out stroke followed by a simple pull on the return stroke will suffice to complete the full cycle of movement necessary to perform the operation of successively applying a sheet of paper in operative position relative to said bed and stripping said sheet of paper from said operative position.

73. In a copying machine, in combination, a bed, a carriage movable along said bed, a platen roller yoke carried by said carriage, a platen roller floatingly carried by said yoke, means responsive to movement of said yoke for locking said carriage in a predetermined region relative to said bed and for releasing said carriage at an instant after said platen roller has contacted with the paper upon said bed, means for latching said yoke in operative position, means operative when said carriage is adjacent to home position for releasing said latching means, and an operating handle carried by said yoke, whereby a simple push on said handle in the running out stroke followed by a simple pull on the return stroke will suffice to complete the full cycle of movement necessary to perform the operation of successively applying a sheet of paper in operative position relative to said bed and stripping said sheet of paper from said operative position, said carriage being provided with means for limiting the movement of said yoke toward said bed.

74. In a copying machine, in combination, a bed, a slide rod extending along one side of said bed, a carriage swingingly and slidably mounted upon said rod, a track for supporting the swinging extremity of said carriage, a platen roller yoke carried by said carriage, a platen roller floatingly carried by said yoke, means responsive to movement of said yoke for locking said carriage in a predetermined region relative to said bed and for releasing said carriage at an instant after said platen roller has contacted with the paper upon said bed, means for latching said yoke in operative position, means operative when said carriage is adjacent to home position for releasing said latching means, and an operating handle carried by said yoke whereby a simple push on said handle in the running out stroke followed by a simple pull on the return stroke will suffice to complete the full cycle of movement necessary to perform the operation of successively applying a sheet of paper in operative position relative to said bed and stripping said sheet of paper from said operative position, said carriage being provided with means for limiting the movement of said yoke toward said bed.

75. In a copying machine, in combination, a bed, a carriage movable along said bed, a pair of racks extending along said bed at the two sides thereof, a pair of pinions carried by said carriage, said pinions being rigidly connected together and adapted to mesh with said racks, a platen roller yoke carried by said carriage, a platen roller floatingly carried by said yoke, means responsive to movement of said yoke for locking said carriage in a predetermined region relative to said bed and for releasing said carriage at an instant after said platen roller has contacted with the paper upon said bed, means for latching said yoke in operative position, means operative when said carriage is adjacent to home position for releasing said latching means, and an operating handle carried by said yoke whereby a simple push on said handle in the running out stroke followed by a simple pull on the return stroke will suffice to complete the full cycle of movement necessary to perform the operation of successively applying a sheet of paper in operative position relative to said bed and stripping said sheet of paper from said operative position.

76. In a copying machine, in combination, a bed, a carriage movable along said bed, a pair of racks extending along said bed at the two sides thereof, a pair of pinions carried by said carriage, said pinions being rigidly connected together and adapted to mesh with said racks, a platen roller yoke carried by said carriage, a platen roller floatingly carried by said yoke, means responsive to movement of said yoke for locking said carriage in a predetermined region relative to said bed and for releasing said carriage at an instant after said platen roller has contacted with the paper upon said bed, means for latching said yoke in operative position, means operative when said carriage is adjacent to home position for releasing said latching means, and an operating handle carried by said yoke whereby a simple push on said handle in the running out stroke followed by a simple pull on the return stroke will suffice to complete the full cycle of movement necessary to perform the operation of successively applying a sheet of paper in operative position relative to said bed and stripping said sheet of paper from said operative position, said carriage being provided with means for limiting the movement of said yoke toward said bed.

77. In a copying machine, in combination, a bed, a carriage movable along said bed, trackways extending along said bed in fixed relationship therewith, said trackways being adapted to support said carriage in a sliding movement along said bed, means for preventing upward movement of said carriage, a platen roller yoke carried by said carriage, a platen roller floatingly supported by said yoke, means for latching and unlatching said platen roller yoke from its operative position relative to said bed, means for limiting the downward stroke of said yoke to a predetermined position, an operating handle carried by said yoke, means cooperating with said yoke for locking said carriage in a predetermined position relative to said bed, and means responsive to movement of said handle for releasing said locking means for said carriage at an instant slightly later than the moment of contact between said platen roller and the paper upon said bed.

78. In a copying machine, in combination, a bed, a carriage movable along said bed, trackways extending along said bed in fixed relationship therewith, said trackways being adapted to support said carriage in a sliding movement along said bed, rack means extending along said bed, pinion means carried by said carriage adapted to mesh with said rack means for holding said carriage in right-angular relationship with the direction of movement of said carriage, means for preventing upward movement of said carriage, a platen roller yoke carried by said carriage, a platen roller floatingly supported by said yoke, means for latching and unlatching said platen roller yoke from its operative position relative to said bed, means for limiting the downward stroke of said yoke to a predetermined position, an operating handle carried by said yoke, means cooperating with said yoke for locking said carriage in a predetermined position relative to said bed, and means responsive to movement of said handle for releasing said locking means for said carriage at an instant slightly later than the moment of contact between said platen roller and the paper upon said bed.

79. In a copying machine, in combination, a bed, a rod extending along said bed, a carriage swingingly and slidably carried by said rod, a track for supporting the swinging extremity of said carriage, means for preventing upward movement of said carriage, a platen roller yoke carried by said carriage, a platen roller floatingly supported by said yoke, means for latching and unlatching said platen roller yoke from its operative position relative to said bed, means for limiting the downward stroke of said yoke to a predetermined position, an operating handle carried by said yoke, means cooperating with said yoke for locking said carriage in a predetermined position relative to said bed, and means responsive to movement of said handle for releasing said locking means for said carriage at an instant slightly later than the moment of contact between said platen roller and the paper upon said bed.

80. In a copying machine, in combination, a bed, a rod disposed along one side of said bed, a carriage swingingly and slidably supported by said rod, a track extending along said bed and adapted to support the swinging extremity of said carriage, racks disposed along said bed, pinions fixed relative to each other and adapted to mesh with said racks for holding said carriage in proper alignment, means for preventing upward movement of said carriage, a platen roller yoke carried by said carriage, a platen roller floatingly supported by said yoke, means for latching and unlatching said platen roller yoke from its operative position relative to said bed, means for limiting the downward stroke of said yoke to a predetermined position, an operating handle carried by said yoke, means cooperating with said yoke for locking said carriage in a predetermined position relative to said bed, and means responsive to movement of said handle for releasing said locking means for said carriage at an instant slightly later than the moment of contact between said platen roller and the paper upon said bed.

81. In a copying machine, in combination, a bed, a carriage movable along said bed, a front stop for said carriage carried by said bed, said front stop being longitudinally adjustable relative to said bed, means carried by said carriage and interacting with said front stop to provide a positive home position lock for said carriage, a platen roller yoke carried by said carriage, a platen roller carried by said yoke, and means carried by said carriage for latching said platen roller yoke in operative position and unlatching said platen roller yoke therefrom, said latching and unlatching means being dependent in function upon the cooperative action of said front stop and said first mentioned means.

82. In a copying machine, in combination, a bed, a carriage movable along said bed, racks disposed along said bed, pinions carried by said carriage and fixed relative to each other adapted to mesh with said racks for aligning said carriage, a front stop for said carriage carried by said bed, said front stop being longitudinally adjustable relative to said bed, means carried by said carriage and interacting with said front stop to provide a positive home position lock for said carriage, a platen roller yoke carried by said carriage, a platen roller carried by said yoke, and means for latching said platen roller yoke in operative position and unlatching said platen roller yoke therefrom, said latching and unlatching means being dependent in function upon the cooperative action of said front stop and said first mentioned means.

83. In a copying machine, in combination, a bed, a carriage movable along said bed, a rod extending along one side of said bed for swingingly and slidingly supporting said carriage, means for slidably supporting the swinging extremity of said carriage, a front stop for said carriage carried by said bed, said front stop being longitudinally adjustable relative to said bed, means carried by said carriage and interacting with said front stop to provide a positive home position lock for said carriage, a platen roller yoke carried by said carriage, a platen roller carried by said yoke, and means for latching said platen roller yoke in operative position and unlatching said platen roller yoke therefrom, said latching and unlatching means being dependent in function upon the cooperative action of said front stop and said first mentioned means.

84. In a copying machine, in combination, a bed, a carriage movable along said bed, a rod extending along said bed for slidably and swingingly supporting said carriage, racks disposed along said bed, pinions carried by said carriage, which pinions are fixed relative to each other and adapted to mesh with said racks for aligning said carriage, a front stop for said carriage carried by said bed, said front stop being longitudinally adjustable relative to said bed, means carried by said carriage and interacting with said front stop to provide a positive home position lock for said carriage, a platen roller yoke carried by said carriage, a platen roller carried by said yoke, and means for latching said platen roller yoke in operative position and unlatching said platen roller yoke therefrom, said latching and unlatching means being dependent in function upon the cooperative action of said front stop and said first mentioned means.

85. In a copying machine, in combination, a bed, a carriage movable along said bed, a rod extending along said bed for swingingly and slidingly supporting said carriage, a front stop carried by said bed, a locking member carried by said carriage and having an abutment cooperating with said front stop for locking said carriage relative to said bed without interfering with the swinging movement of said lock relative to said front stop, a platen roller yoke carried by said carriage, a platen roller carried by said yoke, and means for latching said platen roller yoke in operative position and unlatching said platen roller yoke therefrom, said latching and unlatching means being dependent in function upon the cooperative action of said front stop and said first mentioned means.

86. In a copying machine, in combination, a bed, a carriage movable along said bed, a rod along said bed about which said carriage is adapted to swing in planes normal to said bed, a front stop for said carriage, locking means carried by said carriage and cooperating with said front stop for locking said carriage in predetermined position relative to said bed without interfering with the swinging movement of said carriage while said carriage is in locked relationship with said front stop.

87. In a copying machine, in combination, a bed, a carriage movable along said bed, a platen roller yoke carried by said carriage, a platen roller carried by said yoke, means responsive to movement of said yoke for locking said carriage in a predetermined region relative to said bed and for releasing said carriage an instant after said platen roller has contacted with the paper upon said bed, means for latching said yoke in operative position, and means operative when said carriage is adjacent to home position for releasing said latching means, sufficient yield being provided between said platen roller and the printing surface upon said bed to permit a slight movement of said yoke downwardly after said platen roller has contacted with the paper upon said printing surface.

88. In a copying machine, in combination, a bed, a carriage movable over said bed, a pressure roller rotatably mounted in the carriage, a platen roller floatingly supported for rotation in the carriage and having an operative and inoperative position with respect to the pressure roller, said platen roller when in operative position having, by reason of the floating support, movement in a direction diagonal with respect to the bed.

89. In a copying machine, in combination, a bed, a carriage movable over said bed, a pressure roller rotatably mounted in the carriage, a platen roller, means for floatingly mounting the platen roller in the carriage, said means when the roller is in operative position holding the same under spring tension against the pressure roller and against the bed.

90. In a copying machine, in combination, a bed, a carriage movable over the bed, a pressure roller rotatably mounted in the carriage and having a fixed axis, a platen roller, said roller in operative position engaging the pressure roller, means for floatingly mounting the platen roller in the carriage, said means when the roller is in operative position holding the same under spring tension against the pressure roller and against the bed.

91. In a copying machine, in combination, a bed, a carriage movable over said bed, a pressure roller rotatably mounted in the carriage and having a fixed axis, means operative during the movement of the carriage over the bed for positively rotating the roller, a platen roller floatingly supported for rotation in the carriage, and means resiliently urging the platen roller in a direction diagonal with respect to the bed when the roller is in operative position and thus in contact with the pressure roller.

92. In a copying machine a bed, a slide rod mounted for movement longitudinally of said bed, a carriage slidably mounted on said rod for movement over said bed, a platen roller carried by said carriage and cooperating with said bed, a stop carried by said rod and engageable by said carriage, and manually operable means for securing the rod in a plurality of adjusted positions longitudinally of said bed.

93. In a copying machine a bed, a slide rod mounted for movement longitudinally of said bed, a carriage slidably mounted on said rod for movement over said bed, a platen roller carried by said carriage and cooperating with said bed, an adjustable stop carried by said rod and engageable by said carriage, and manually operable means for securing the rod in a plurality of adjusted positions longitudinally of said bed.

94. In a copying machine, a bed, a slide rod mounted for movement longitudinally of said bed, a carriage slidably mounted on said rod for movement over said bed, a platen roller carried by said carriage and cooperating with said bed, a stop carried by said rod and engageable by said carriage, and means carried by said bed for securing said rod in a plurality of adjusted positions longitudinally of said bed.

95. In a copying machine, in combination, a bed, a carriage reciprocal over said bed, a swinging yoke carried by said carriage, a platen roll pivoted in said yoke, a pressure roll pivoted in said carriage, the axis of rotation of said pressure roll being fixed with respect to said carriage, and means movable with said carriage and providing a driving connection between said yoke and said pressure roll, said means comprising gears permanently in mesh with each other.

RUDOLPH WEIDE.